US008915669B1

(12) United States Patent
Gustafson et al.

(10) Patent No.: US 8,915,669 B1
(45) Date of Patent: Dec. 23, 2014

(54) CROSS STREET TRANSIT AND MULTIMODAL MULTI-LEVEL STATION AND PEDESTRIAN-ORIENTED INTERCHANGE

(71) Applicants: Thomas F. Gustafson, Wellington, FL (US); Naphtali Rishe, Miami Beach, FL (US); Ramon Trias, Miami, FL (US); Kenneth Stapleton, Bay Harbor Island, FL (US)

(72) Inventors: Thomas F. Gustafson, Wellington, FL (US); Naphtali Rishe, Miami Beach, FL (US); Ramon Trias, Miami, FL (US); Kenneth Stapleton, Bay Harbor Island, FL (US)

( * ) Notice: Subject to any disclaimer, the term of this patent is extended or adjusted under 35 U.S.C. 154(b) by 0 days.

(21) Appl. No.: 13/907,085

(22) Filed: May 31, 2013

(51) Int. Cl.
| | |
|---|---|
| *E04H 1/04* | (2006.01) |
| *E04H 14/00* | (2006.01) |
| *B61B 1/02* | (2006.01) |
| *E01C 1/00* | (2006.01) |
| *E01C 15/00* | (2006.01) |
| *E04H 3/00* | (2006.01) |
| *E04H 6/08* | (2006.01) |
| *E01C 1/04* | (2006.01) |

(52) U.S. Cl.
CPC *E04H 14/00* (2013.01); *B61B 1/02* (2013.01); *E01C 1/002* (2013.01); *E01C 15/00* (2013.01); *E04H 3/00* (2013.01); *E04H 6/08* (2013.01); *E01C 1/04* (2013.01)
USPC .......................................................... 404/1

(58) Field of Classification Search
CPC .................................. E01C 1/04; E01C 1/002
USPC ............................................................ 404/1
See application file for complete search history.

(56) References Cited

U.S. PATENT DOCUMENTS

| 169,819 | A | * | 11/1875 | Lozier | 104/124 |
|---|---|---|---|---|---|
| 671,686 | A | * | 4/1901 | Bergeron | 405/132 |
| 1,515,251 | A | * | 11/1924 | Graves | 104/27 |
| 1,628,934 | A | * | 5/1927 | Turner et al. | 104/27 |
| 1,628,935 | A | * | 5/1927 | Turner et al. | 104/27 |
| 1,629,787 | A | * | 5/1927 | Hackett | 52/175 |
| 1,748,309 | A | * | 2/1930 | Rose | 104/28 |
| 3,405,612 | A | * | 10/1968 | Pearson | 404/1 |
| 3,847,496 | A | * | 11/1974 | Stankiewicz | 404/1 |
| 5,671,681 | A | * | 9/1997 | Senior, III | 104/138.1 |
| 7,857,543 | B2 | * | 12/2010 | Troster | 404/1 |
| 8,172,478 | B2 | * | 5/2012 | Sing | 404/1 |
| 2014/0205376 | A1 | * | 7/2014 | Derenoncourt | 404/1 |

\* cited by examiner

*Primary Examiner* — Raymond W Addie
(74) *Attorney, Agent, or Firm* — Melvin K. Silverman

(57) ABSTRACT

A cross street station and interchange for use at the intersection of a local traffic artery with significant pedestrian-oriented improvements and features that runs between but not through two communities and a primary traffic artery that divides two dissimilar communities. It uses a variable bi-level regional mass transit platform for ticketed passengers lowered from the upper level of the cross street station and interchange to the street level and provide a platform level with the regional mass transit vehicle floor and a ramp to the height elevation of the sidewalk to disembark arriving regional mass transit passengers and allow for the boarding of the new mass transit passengers. The cross street station and interchange includes in close proximity to this platform a metropolitan mass transit stop on the primary traffic artery and local community transit services stop on the local traffic artery that can also accommodate paratransit passengers.

55 Claims, 7 Drawing Sheets

CROSS STREET TRANSIT AND MULTIMODAL MULTI-LEVEL STATION AND PEDESTRIAN-ORIENTED INTERCHANGE

BACKGROUND OF THE INVENTION

People are attracted to a local street (hereinafter referenced as a local traffic artery) that possess but two narrowed lanes of slow traffic, wide sidewalks, shade trees, landscape and hardscape improvements, and multi-story mixed-use and community destination buildings, with frequent storefront retail uses, arcades, awnings, and building entry areas that line the street to shelter and support large-scale pedestrian movements by responding to their needs. Such a pedestrian-oriented street will exhibit various landscape and hardscape improvements including decorative lighting, benches, seating areas, fountains, public art and similar improvements that are useful, comfortable and safe from a pedestrian's point of view so as to establish what is referred to as and "outdoor living room" urban environment. In this document, "pedestrian-oriented" is a term used to describe any structure or service that is useful, comfortable, and safe for pedestrians as well as responsive to their specific needs.

When combined with other roadway improvements to slow vehicular traffic speeds and elevate the height of surfaces where people will be walking and sitting within the "outdoor living room", a community can be transformed from one that is dominated by congested automotive traffic and disbursed short pedestrian movements into one that exhibits fewer and shorter automotive trips, longer and more frequent regional, metropolitan and local transit trips, and longer more frequent pedestrian and bicycle trips focused into a community centric multimodal access environment and the identified mixed-use and community destinations contained therein. The nature and character of these pedestrian-oriented streets in the context of transit oriented development is well-known, but not often achieved due to complexities involved in establishing and maintaining so many environmental conditions within a system of interconnected pedestrian-oriented and transit-oriented improvements. In this document, 'transit-oriented development' means a community that provides superior access to multiple and frequently available transit vehicles used by pedestrians, bicyclists and motorists resident within or visiting the community to complete local, metropolitan and regional trips.

Pedestrian-oriented and transit-oriented development are discussed frequently in prior art (e.g., most recently at Ewing, Reid and Keith Bartholomew, *Pedestrian-and Transit-Oriented Design*. Washington, D.C.: Urban Land Institute and American Planning Association, 2013).

It is well understood from prior art and the comparison of pedestrian behaviors in different urban and suburban environments that large-scale pedestrian movements within a local traffic artery and community environment (i.e., where thousands or hundreds of thousands of people walking throughout the day) occur when pedestrian-oriented streets are built to protect pedestrians from the wind, rain, heat and cold and are more useful, safe, and comfortable than streets not so arranged. Further, when the activities of the pedestrian-oriented streets are interesting and fun larger numbers of pedestrians gather and stay longer.

Such pedestrian-oriented streets can improve the pedestrian travel connections between local destinations, increase the length and frequency of pedestrian trip segments, and provide improved access to comfortable, frequent, safe, and clean multimodal transportation that provides an easy connection to and from a multitude of useful and necessary destinations within the local communities, the region, and beyond. See Community Intermodal Transit System (U.S. Pat. No. 7,886,910); and, Ergonomic Hybrid Transit Access Corridor Particularly for Town and Urban Centers (U.S. Pat. No. 6,561,727 B1).

To create a safe and high-quality pedestrian-oriented local traffic artery and community environments for pedestrians and bicyclists, vehicular traffic must be marginalized and when it is present, it must be reduced to operating speeds or 20 miles per hour or less. The laws of physics and human biological frailties indicate that when pedestrian and bicyclists come into direct physical contact with car and truck vehicles where the vehicular speeds are greater than 20 miles per hours, the consequences are often deadly for the pedestrian and bicyclists. When car and truck speeds increase to 35 miles per hour and higher speeds, such contact is almost always deadly to the pedestrian and bicyclist.

Local traffic artery and community environments deadly or adverse to pedestrians and bicyclists due to higher vehicular speeds cannot be safe, attractive, and high quality environments regardless of any other pedestrian-oriented improvements that are made since even the threat of deadly consequence will discourage most pedestrians and bicyclists from trying to use the street or experiencing the attributes the community has to offer. Creating a separation between faster vehicular movements and slower pedestrian and bicyclist movements at the intersection of pedestrian-oriented two lane and two directional local traffic artery (hereinafter referred to as a "local traffic artery" or where the context requires, "local traffic arteries", a "pedestrian-oriented local traffic artery" or "pedestrian-oriented local traffic arteries") and a much larger four lanes or more higher speed regional or metropolitan highway (hereinafter referred to as a "primary traffic artery") and collocating multimodal and multi-level transit opportunities at that intersection (hereinafter referred to as a "traffic artery intersection") can be very useful whenever communities seek to: reduce pedestrian and bicyclist traffic fatalities; reduce private passenger vehicle miles traveled and traffic congestion; increase average region trip speeds; increase frequency and length of pedestrian trips; and, increase multimodal transportation within the community and outward to the metropolitan area and region.

If is further observed that highway departments in many jurisdictions will approve at the intersection of a primary traffic artery and a local traffic artery at-grade safety crossing improvements, in addition to traffic artery intersection traffic stop lights, that include reducing traffic lanes to 11 feet in width and automotive operating speeds to less than 35 miles per hour. Highway engineers generally provide for 12 feet or more of traffic lane widths consistent with car and truck safe operating speeds of 35 miles per hour or higher speeds, but will accept somewhat more narrow traffic lanes at an intersection and for some distance before the intersection where pedestrian and bicyclists frequently cross the primary traffic artery lanes.

This is consistent with situations when and where a vehicle needs to slow its speed to 20 miles per hour or less in order to: stop at the traffic light controlled intersection (i.e., stopping at the red light); negotiate a turn at the intersection from the primary traffic artery to another roadway; or, avoid pedestrian and bicyclist fatalities at the traffic intersection where large numbers of pedestrians frequently cross the intersection at-grade (i.e., at a street level elevation).

For the same reason, despite the fact that most local traffic arteries are 12 foot or wider, local governments will approve 10 feet or less traffic lane widths for local traffic arteries where: pedestrians and bicyclists are frequently traveling along with local car and truck traffic; higher vehicular speeds are not encouraged or allowed for safety reasons; and, the community's residents, business owners, and visitors want vehicles to stop at the mixed-use and community destination buildings found along the local traffic artery. This is the first of several roadway improvements that help to reduce vehicular speeds to 20 miles per hour or less and establish a local traffic artery.

It is also well recognized that safe vehicular speeds in the presence of pedestrian children have been established at 20 mile per hour or less. In school traffic zones across America, slower traffic speeds are required to create a safe walking environment for school children.

It is therefore the intent of this invention to extend this practice to residential communities, a local traffic artery that spans between them, a primary traffic artery that separates them, and the traffic artery intersection as between the local traffic artery and primary traffic artery in order to teach how multiple safe crossing improvements established at varying elevations adjacent to where the traffic artery intersection can serve the purpose of aggregating pedestrians, bicyclists, and other residents of and visitors to the residential community on one side of the primary traffic artery with the pedestrian, bicyclists, and other residents of and visitors to any adjacent community located immediately on the other side of the primary traffic artery within a compact multi-level area proximate to multimodal access opportunities so that intermodal transfers frequently occur. For purposes of this document, the safe crossing improvements to be discussed include pedestrian-oriented shared-use bridges or tunnels, frequent passage through the traffic artery intersection via community transit vehicle, and substantially all of enumerated at-grade safe crossing improvements: the narrowing of traffic lanes; making more rough the surface of those lanes of traffic; roadway stripping to clearly demark pedestrian and bicycle crossing areas; larger medians with shade trees or other vertical structures; rising the roadway surface to the sidewalk height elevation at midblock, intersections, and crosswalk areas within that raised roadway surface; pedestrian controlled traffic control lights; limited areas within the traffic artery intersection for tight turning radii; enhanced illumination during the nighttime; and, other at-grade safe street crossing improvements that tend to slow traffic. Further, by providing for varying elevations, vehicular traffic can be more completely separated from pedestrian and bicycle traffic, and where vehicular traffic must cross with and the movements of pedestrians and bicyclists, and the community possessing such varied roadway and walking areas vehicular characteristics.

The purpose of such a cross street transit and multimodal multi-level station and pedestrian-oriented interchange, referred to hereinafter as a "cross street station and interchange", is to create, over long time periods, multi-level structural and operational improvements that facilitate a safe crossing at the traffic artery intersection and also improve large-scale access and more frequent use of regional mass transit, metropolitan transit, local community transit services by making it easy for all residents of and visitors to the communities on both sides of the primary traffic artery to become pedestrians, bicyclists, or users of local community transit services before crossing the traffic artery intersection. The reference to multi-level structural and operational improvements "over a long time period" means that with minor alterations that can be quickly installed, the pedestrian-oriented and transit improvements will remain operational notwithstanding frequent inundation arising from expected climate change impacts during the next 100 years.

In this context, the invention can be viewed as a means to direct a defused local population within two adjacent communities to concentrate their pedestrian, bicycle, and slow moving local community transit services movements that enter or leave the communities between them to a single location where safe and large-scale passage through the primary traffic artery is assured and welcomed experience (i.e., useful, safe, and comfortable, in an area substantially protected from the wind, rain, heat, and cold) for many thousands of travelers each day. This phenomenon will be referenced as the "hourglass effect" or similar "hourglass" allusions. The passage through the primary traffic artery separating these two communities remains obscured and blocked elsewhere through the substantially pedestrian hostile environment of the primary traffic artery that exists as an obstacle to safe and frequent pedestrian and bicyclist crossings along the length of the primary traffic artery other than at the improved traffic artery intersection. This "hourglass effect" works best with public events that are interesting and fun (i.e., entertaining) and occurring within the local traffic artery, plaza, and public realm areas around the multimodal access improvements.

What is not yet understood by those skilled in the various areas of expertise (e.g., experts in the subject areas of pedestrian and bicyclists traffic safety, urban design, transit oriented development, traditional plaza architecture and functionality, mixed-mode streets, sustainable/livable community development, adaptation to the impacts of climate change, and related subject areas) is how to assemble of all known compatible traffic safety and intermodal transit station improvements into one system of systems, where all pedestrian-oriented structural and operational components are proximate to multimodal access areas including a variable bi-level passenger boarding and disembarking platform for regional mass transit vehicles. Such a regional mass transit platform can adjust to a location and height immediately proximate to the floor of various regional mass transit vehicles scheduled to stop at that platform equipped station location where virtually all of the cross street station and interchange improvements can lie within the publically available right-or-way and airspace above the local traffic artery proximate to the traffic artery intersection with the primary traffic artery and to a lesser degree within the right-of-way and airspace of the traffic artery intersection of these two traffic arteries.

Throughout this document the terms pedestrian, pedestrian-oriented, and walking include people traveling in wheelchairs and similar devices for the transportation disadvantaged and children when moving at speeds approximately equal to walking speeds of 3 to 4 miles per hour and all features described herein comply with applicable Americans with Disability Act (ADA) standards as enforced within the United States of America. In addition, as used herein:

1) "regional" means an urbanized area consisting of several adjoining counties or metropolitan jurisdictions where at least several millions of people live, learn, work and play within discrete metropolitan areas, cities or the many local communities where for many socioeconomic reasons the resident population frequently travels between discrete locations within the region;
2) "metropolitan area" means an urbanized area consisting counties or similar jurisdictional areas comprising of several or more cities and multiple local communities;
3) "local" means an area encompassing an urban or suburban city with multiple communities, a single community, or a grouping of related communities;
4) "regional mass transit" or "regional mass transit vehicle" means passenger train, fixed-guideway transit, and express bus providing passenger transport to destinations within the region with approximately 2 miles distance or more between most stops and using limited access highway corridors or dedicated rail, guideway or highway corridors;

5) "metropolitan mass transit" or "metropolitan mass transit vehicle" means bus and other transit services where the vehicle that stops frequently (e.g., every 2 mile or less) at destinations throughout the county or metropolitan area using state and county highways that have traffic control lights at traffic artery intersections every few blocks or dedicated rail, guideway or highway corridors;

6) "community transit vehicle" means smaller buses, bus shuttle vehicles, passenger vans, small rubber tire trolleys, golf cart-type shuttle vehicles, narrow gauge trail trams (see FIGS. 8A, 8B, and 8C from the Ergonomic Hybrid Transit Access Corridor Particularly for Town and Urban Centers, U.S. Pat. No. 6,561,727 B1) and similar vehicles that provide for a local community transit services with specific reference to the crossing the primary traffic artery along the alignment of the local traffic artery and passing through the cross street station and interchange;

7) "paratransit vehicle" means various automotive vehicles usually consisting of cars, trucks, and vans that are equipped for transport of the transportation disadvantaged throughout a county of metropolitan area;

8) "community-based paratransit vehicle" means a paratransit vehicle that is used locally to transport the transportation disadvantaged to a local destination where necessary services are provided to the transportation disadvantaged or to a multimodal station so that the trip can be completed via metropolitan mass transit or regional mass transit and, when needed, another community-based paratransit trip segment in order to complete such trips for the travel disadvantaged anywhere in the metropolitan area or region and that can provide for a local community transit services when not needed to be used as paratransit vehicles; and, 9) "local community transit services" means local passenger transport services provided by community transit vehicles and community-based paratransit vehicles or both.

Pedestrian-oriented streets work best to aggregate large numbers of pedestrians (i.e., thousands per day) when limited to: no more than two vehicular traffic lanes that are 10 feet wide or less; vehicular traffic speeds are limited to 20 miles per hour or less; sidewalks on either side of the traffic lanes are 10 feet wide or more; and, the terminal destinations on the local traffic artery are outward approximately one-half mile from a regional mass transit station or stop that provides access to local community, metropolitan, and regional mass transit.

Such local traffic artery aggregate larger numbers of pedestrians when substantially continuous mixed-use and community destination buildings are present at a height of four or more stories with frequent doorways, courtyards, entryways, optically transparent or open windows, balconies, exterior stairways, arcades, awnings, and similar façade or entry features and they are located outward from and adjacent to the sidewalks that are themselves outward and adjacent to the local traffic artery.

Further, pedestrians are attracted to plazas that have similar pedestrian-oriented improvements and that due to the additional public space found there are useful for frequent community events and attractions occurring therein. For purposes of this document, a plaza and the public space it defines:

1) A sidewalk-like walking surface wider than a pedestrian-oriented local traffic artery that presents an attractive surface pattern and texture suited for comfortable walking and that allows for gathering of all the socio-economic population segments of the adjacent communities in a built environment that is useful, safe, and comfortable and circumscribed by mixed-use buildings typically built to a height of approximately six or more stories including buildings of great significant to the communities such as the city hall, a market, places of worship, library, educational facilities, theaters, museums, and restaurants with the understanding that plazas work best to gather the community population when the activities and events therein are also interesting and fun 2) Shade trees in parts of but not in all of the plaza areas 3) Landscaping and various streetscape improvements such as decorative lighting, benches, seating areas, fountains, public art and similar improvements that are useful and attractive from a pedestrian point of view 4) Very restricted or no vehicular traffic 5) Structural protections from the wind, rain, heat, and cold, but mostly in an open-air environment Specifically, plazas as addressed herein have sidewalk areas at least twice as wide and frequently wider when compared to the local traffic artery or other streets leading to the plaza and they have more limited vehicular traffic than local traffic arteries and therefore such plazas have greater pedestrian-orientation than the local traffic artery. Compared to a local traffic artery, the plaza: has less vehicular traffic and more sidewalk area that is useful, safe and comfortable; is to a similar degree protected from the wind, rain, heat, and cold; allows for the a more safe and comfortable gathering of all segments of the community; and offers a venue for events that are more interesting and fun.

Plazas and the socioeconomic function they serve can be best witnessed in communities outside of America. See Lennard, Henry and Suzanne H. Crowhurst Lennard, Genius of the European Square. Carmel, CA: Gondolier Press and International Making Cities Livable Council, 2007. Also see Lennard, Henry and Suzanne H. Crowhurst Lennard, *The Forgotten Child: Cities for the Well-Being of Children*. Carmel, CA: Gondolier Press and International Making Cities Livable Council, 2007.

Vehicular movements at a plaza can be limited by one or more of several means: vehicular speeds can be reduced to approximately 10 miles per hour or less; private passenger cars and trucks can be prohibited all together or during times of the day and early evening when pedestrian, bicycle, and local community transit vehicles are most active; large commercial trucks can be prohibited; and, vehicular traffic can be limited to only a small subset of the area defined by the plaza improvements. Even with these vehicular limitations, community transit vehicle and community-based paratransit vehicle are allowed to be routed through the plaza and to pick up and discharge passengers at the plaza.

Bicycle movements occur in the local traffic artery traffic lanes (frequently drafting in behind community transit vehicle and community-based paratransit vehicle or within the sidewalks areas when the pedestrian crowds are reduced or when the bicyclist is quiet young and moving at pedestrian speeds. More frequently, the bicyclist walks the bike through the pedestrian crowd. See Zacharias, John, "The Amsterdam Experiment in Mixing Pedestrians, Trams and Bicycles", *ITE Journal* (1999). Bicycle lanes can be established and shared with faster moving pedestrian traffic at a higher elevation than adjacent the adjacent traffic lane used by motorized vehicles (i.e., approximately four to eight miles per hour).

Where a sidewalk has an initial sidewalk segment with a lower elevation relative to the local traffic artery and a second sidewalk segment higher than the first sidewalk segment along the local traffic artery, bicycle traffic at speeds less than 10 miles per hour can share this initial sidewalk segment with pedestrians walking at faster speeds and who intermittently give right-or-way to bicyclists.

When one plaza is attached at one or both termini of such a local traffic artery, large-scale pedestrian movements would occur on a daily basis (i.e., thousands of people walking) as the population of and visitors to the two communities are drawn from one event or attraction to the other event or attraction in the plazas along the local traffic artery. This works best if at least one plaza was located at least ½ mile outward from the primary traffic artery and a multimodal transit station and stops locate at the traffic artery intersection. In such case, events at a plaza adjacent to, for example, a city hall would attract people to it for all kinds of civic functions or a plaza adjacent to, for example, events at a university library would attract people to numerous educational and cultural events.

A well-known American example of this kind of phenomena between significant destinations is the large-scale pedestrian movements that occur daily at Inter Harbor in Baltimore, Md. along the improved waterfront (constituting a pedestrian street) between The National Aquarium and the Maryland Science Center. These two nationally recognized destinations are places of significant interest drawing pedestrians from one destination to the other and to the smaller venues in between. A similar phenomenon can be witnessed at any American shopping mall as shoppers walk between large nationally recognized retail businesses that anchor two or usually more "ends" of the mall and to or past smaller stores in between the anchor shopping destinations. A unique aspect of this invention would be that such large-scale pedestrian movements can be generated in an outdoor environment and without large proprietary destinations; plazas, local traffic artery, mixed-mode buildings, and locally significant destinations are sufficient for the intended purpose of facilitating the large-scale movement of pedestrians and other pedestrian-oriented movements between destinations and to local, metropolitan and regional mass transit.

As events occur at one plaza or another people are first drawn from the respective communities to their respective community plaza and the local traffic artery before walking, using their bicycles, or taking local community transit services to the multimodal transit station or stops adjacent the primary traffic artery in an hourglass effect that focuses all pedestrians, bicyclists and residents of and visitors to the respective communities to the improved and safe traffic artery intersection. By this means, the local traffic artery acts as a beam or rigid rod and the multimodal multi-level transit access areas at the safe crossing area functions as a fulcrum to establish for a simple community-to-transit-to adjacent community leveraging machine. As the input force of activities at one plaza and the local traffic artery is applied within the substantially residential community, an output force occurs within the other community when populations are draw to such activities across the primary traffic artery. As events occur at one plaza or the other, the effect of the multimodal and multi-level transit access improvements combined with the at-grade safe traffic artery intersection improvements, local community transit services, and the pedestrian-oriented shared-use bridge is that of an inclined plane over the primary traffic artery obstacle.

A primary traffic artery is a four or more lane highway for regional or metropolitan travel where the traffic speed authorized at 35 miles per hour or more and traffic lane widths are 12 feet or more wide. Adjacent to primary traffic arteries there are limited or no sidewalk areas for pedestrians and sidewalks that are provided are often 5 to 8 feet wide. Primary traffic artery street crossings may have traffic lights to control car and truck movements at the intersections with other regional, metropolitan area, and local traffic arteries, but short time periods are allocated for pedestrian or bicycle movement to cross the traffic arteries. Lighting is sized and positioned for primarily for traffic visibility.

Few shade trees exist along a primary traffic artery, although landscaping attractive to the motorist is often in view. Virtually every resident uses the primary traffic artery. Few pedestrians make daily use of the primary traffic artery (e.g., tens or upwards to a hundred people a day). Bicyclists will more frequently make daily use of a primary traffic artery if a bike lane is provided. Pedestrian and bicyclist traffic fatalities along primary traffic arterials can be quite common. In America for the last decade: pedestrian traffic fatalities have numbered 4000 to 5000 persons per year; and, bicyclist traffic fatalities have numbered in the hundreds per year.

This routine of killing of pedestrians and bicyclists phenomena on America's streets arises from the system of transportation improvements that result in "stop and go" traffic and the immediate juxtaposition of fast moving traffic in private passenger vehicles that are legally considered "dangerous instrumentalities" and slower moving and significantly more fragile pedestrians and bicyclists. What is needed is a means of transport that separates the fast vehicular movements from slower pedestrian and bicycle movements and uses each to create a much safer and regionally faster and more efficient "fast and slow" method of transportation.

When two communities are bisected by a primary traffic artery, especially when one is a less affluent suburban community and the other is a more affluent university campus or commercialized community, such that no safe crossing exists for pedestrians or bicyclists and assuming transit services between the two communities is limited or non-existent, then limited crossing of the primary traffic artery will occur from one community to the next via private passenger vehicles and even less via pedestrian, bicycles or various transit vehicles.

Further, many other related adverse outcomes arise:
1) Each community tends to exist separate from the other
2) Socioeconomic benefits the communities might gain from joint activities are largely absent despite such benefits being widely understood
3) Regional mass transit is underutilized and ridership is diminished as additional stops at each community must be added to the transit routes and travel times increase with more frequent stops (since the pedestrian, bicycle and local transit trips between communities that would allow both communities access the regional mass transit in but one community or the other is virtually non-existent)
4) When facilities shared by both communities are established and activities of mutual interest to both communities occur, pedestrian traffic injuries and death increase at the intersection of any street that crosses the primary traffic artery If a means existed for pedestrians, bicyclists and local transit customers on a local traffic artery that crosses a primary traffic artery to more safely and in more comfort cross the primary traffic artery and to access regional mass transit and metropolitan transit within limited spaces mostly afforded by the local traffic artery right-of-way and airspace adjacent the intersection with the primary traffic artery and to a lesser degree, within the right-of-way and airspace of the intersection of these two arteries, then the two communities would become more integrated and able to reinforce functionally useful, financially rewarding and personally enjoyable social interactions with themselves and others. There would also be a measurable: increase in regional mass transit use, the trip travel times between the two communities and regional destination, and the frequency and length of pedestrian trip segments; reduction in private passenger miles traveled and traffic congestion associated with local, metropolitan, and regional car trips to and from the two communities; and, fewer traffic fatalities and injuries, but especially those afflicted upon pedestrians and bicyclists.

Assuming a one mile or more segment of a local two-lane street was improved to become a more pedestrian-oriented local traffic artery as described above or as taught by the Ergonomic Hybrid Transit Access Corridor Particularly for Town and Urban Centers (U.S. Pat. No. 6,561,727 B1) and a plaza was located at each end of such a local traffic artery segment that was bisected by the primary traffic artery (placing a plaza at both termini of such local traffic artery segment on opposite sides of the primary traffic artery), residents and community visitors could have an improved transportation opportunities as pedestrians and bicyclists if an improved method to cross the primary traffic artery could also be devised at the intersection of the primary traffic artery and the local traffic artery.

When community residents and visitors depart from their homes, businesses, work locations, and local destinations within their respective communities and arrived at their community plazas and local traffic artery (or in the reverse during the return trip when arriving back home or similar destination), they would need a useful, safe, and comfortable access to the other community plazas and better access to the full length of the local traffic artery though some kind of interchange; like a modern, safe and efficient limited access highway interchange for vehicular traffic, but structured specifically to provide a means for multimodal access as well as safe passage across the primary traffic artery for pedestrians and bicyclists. It would have many functions observed within the operations of the Grand Central Station in New York City, N.Y. or other large multimodal stations as they exist in the world, but with functional differences appropriate to the much more localized conditions as described herein. Such functionalities would increase if the plazas and other public areas where venues for events that were interesting and fun.

If local community transit services frequently operated in both directions along the local traffic artery from one pedestrian-oriented plaza to another and a provision was made for a comfortable stop between plazas at such cross street station and interchange, pedestrians would be able to break the trip into a series of short walks and community transit trips. Alternating between walking and community transit vehicle could allow a pedestrian to be quickly reactive to weather and other changing conditions and undertake longer pedestrian trip segments intermixed with community transit vehicle trip segments. Similar intermittent walking and community transit vehicle rides could have the same benefit for bicyclists moving through the community at moderate speeds (i.e., 4 to 8 miles per hour).

Further, if the building heights, arcades, awnings and other building edge features could provide not only protection from the weather, but allow the pedestrian to change the weather by simply changing the location within the local traffic artery where the walking occurs (e.g., the use of microclimates to stay comfortable), then walking longer distances would be more common (i.e., a one-half mile or more walk to a community plaza, then another one-half mile or more walk along a local traffic artery to a cross street station and interchange faculties at the traffic artery intersection, and then either proceeding to the adjacent community along the continuation of the local traffic artery to a second plaza and beyond for another half-mile or more walk or accessing regional mass transit and metropolitan transit at stations or stops for destinations linked to such transit and after the mass transit trip segment ends, walking for another one-half mile more or less to the ending destination).

In all these situations, the willingness and ability to walk is expanded and willingness to take frequent and more rapid regional mass transit is increased. Community transit vehicles and metropolitan mass transit vehicles as well as the plazas and local traffic artery act as feeder systems to the regional mass transit station. As obstacles to walking and taking transit are removed, it is not surprising that people walk longer than typical distances in larger than typical numbers to access transit more frequently.

If structured parking was available in large supply (i.e., hundreds and collectively thousands of parking spots) near the plazas, the local traffic artery, and multimodal stations, then those residents from other communities, who travel by car to these communities as visitors, could be more inclined to park, walk and take transit for the remainder of their trip segments. Residents who have parked in the community parking garages will use their cars less once they vehicles are no longer immediately adjacent their residence. Pedestrian activity and use of adjacent transit opportunities will increase if liner buildings with arcades, awning and adjacent sidewalks with pedestrian-oriented landscaping, hardscape, and other features are developed around the parking areas similar to those associated with the local traffic artery. Such parking could consist of a Mixed-Use, Pedestrian-Oriented Parking Structure (U.S. Pat. No. 7,784,228 B2).

If the existing paratransit services for the transportation disadvantaged used the cross street station and interchange when transporting passengers, paratransit services could shorten its trips so as to be limited to the communities surrounding a cross street station and interchange. These community-based paratransit vehicle trips could be completed by allowing the transportation disadvantaged to use regional mass transit and then at the other mass transit stations and stops, use another cross street station and interchange, local traffic artery, plaza, and local community transit services located in different communities across the region to complete such trips. The returning trips could follow the same trip segments in reverse or involve the use of the existing larger paratransit vehicle being used throughout the metropolitan area for return paratransit trips throughout their useful life. Such community-based paratransit vehicle would not have to be as large as traditional paratransit vehicles for shorter community paratransit trips needing to put fewer passengers into the vehicle per short trip. Paratransit could thereby expand to serve regional destination without expanding the capacities of traditional paratransit services.

If such a cross street station and interchange situated in a low elevation coastal community was to remain operational after climate change conditions has caused sea level impacts to become obvious and debilitating due to frequent inundation, it would need its upper level to be at a significant height (i.e., at least 20 feet above the current street level of the traffic artery intersection) and the cross street station and interchange would need to be planned and constructed such that it remained operational even if the elevation of the adjoining traffic arteries and other properties within the adjacent communities were raised so that they would all remain operational over many decades and possible hundreds of years despite sea level rise.

In these and related circumstances, if such an cross street station and interchange was positioned upon a segment of the local traffic artery where a wider, well landscaped and streetscaped sidewalk was provided to establish a plaza environment around the cross street station and interchange and the cross street station and interchange was also positioned immediately adjacent and on either one or both sides of the primary traffic artery, it could be so structured so as to provide a means for improved multimodal access to regional mass transit as well as safe passage across the primary traffic artery.

Further, of five well-known means that can be used optimize the safe crossing of the primary traffic artery by pedestrians and bicyclists: by various at-grade traffic artery intersection improvements to slow and stop oncoming primary traffic artery vehicles; by a pedestrian-oriented shared-use bridge above the primary traffic artery; by frequent community transit vehicles or, as necessary, community-based paratransit vehicles crossing the primary traffic artery along a local traffic artery alignment; by a tunnel below the primary traffic artery; and, by bridging the primary traffic artery over the traffic artery interchange. A crossing of the primary traffic artery would be mostly optimized from a pedestrian-point of view if at least the first three methods were used in close proximity to the cross street station and interchange and if the pedestrian-oriented shared-use bridge was wide enough for large-scale pedestrian movements and to include within its width the positioning of impulse retail and refreshments kiosk stands, bicyclists usually walking next to their bikes and the occasional golf cart-sized parking shuttle (approximately 20 to 30 feet in width). Where costs can be justified, the fourth or fifth means can be used as well.

Further, other destinations would be accessible from the cross street station and interchange via existing metropolitan mass transit routes, if a metropolitan mass transit stop was positioned on the primary traffic artery in a location within the outer traffic lane just before the location where the regional mass transit vehicle stop was located.

This upper level of the cross street station and interchange therefore acts as a fulcrum in the context of the local traffic artery which functioned as the rigid rod so that community events at a plaza at one or both termini of the local traffic artery supply the force and weight to move residents safely and easily from one community to the other and into all transit opportunities. By this means, residents who originally were dispersed throughout the two communities and visitors who arrived by private passenger vehicle and regional mass transit can be gathered together and be focused as a concentration of pedestrians, bicyclists, and users of community transit through the local traffic artery and at especially cross street station and interchange (i.e., using the hourglass effect to focus populations in both communities to the improved transit access, the frequent transit use, easy multimodal transfers, and pedestrian and bicycle trip segments).

Acting as if a simple lever, such a cross street station and interchange can move community residents and visitors to and across the primary traffic artery more frequently and in larger numbers as pedestrians, bicyclists, and users of community transit. They will more often arrive at destinations within both communities along the local traffic artery and enjoy more access to regional and metropolitan mass transit and the destinations served by such transit. Regional visitors will more frequently arrive such that one or more segments of their trip segments was accomplished via regional mass transit and as pedestrians and bicyclists.

As a result, such a cross street station and interchange would:
1) Reduce vehicles miles traveled (i.e., a reduced number of miles traveled in private passenger vehicles)
2) Increase multimodal trips and trip segments
3) Decrease greenhouse gas (GHG) emissions from private passenger vehicles
4) Reduce the number and tragic consequences of pedestrian and bicyclist traffic fatalities
5) Improve community health as walking and bicycling occurs more frequently and for longer distances
6) Provide a significant basis for more prosperous and safer communities that will remain resilient over the long term notwithstanding global competition and climate change and especially sea level rise impacts to low elevation coastal communities These more frequent multimodal trips and other results will occur more frequently in the presence of an Informer Traveler Program and Applications (see our application Ser. No. 13/847,024).

SUMMARY OF THE INVENTION

This invention defines a safe, pedestrian-oriented, multi-level, multimodal access structure and process, located at the intersection of a primary traffic artery and a local traffic artery and along a local traffic artery with a plaza at least at one termini of said local traffic artery that provides for an improved method of multimodal access: for community populations separated by a major traffic artery; and, to the respective destinations within each community and those destinations accessible via regional mass transit that arrives and departs from a safe, pedestrian-oriented, multi-level, multimodal access structure.

The present cross street station and interchange for use at an intersection of a two-lane automotive traffic artery suitable for local pedestrian, bicycle, and local community transit services (i.e., a local traffic artery) and a larger automotive traffic artery consisting of four traffic lanes or more suitable for metropolitan and regional automotive and mass transit travel (i.e., a primary traffic artery) and along the length of the local traffic artery and at its plaza terminus, consists of:
1) all or substantially all of the well-defined at-grade pedestrian safe crossing improvements along the local traffic artery and adjacent the alignment of the local traffic artery and as it moves through the primary traffic artery such that they slow traffic and clearly identify for vehicular occupants where pedestrians can be expected to cross either street;
2) pedestrian-oriented shared-use bridge with wide enough for small refreshments and other impulse retail kiosks at the base of and over the course of the pedestrian-oriented shared-use bridge that crosses the primary traffic artery;
3) boarding and disembarking area for community transit vehicles and community-based paratransit vehicles situated immediately adjacent to the local traffic artery before it crosses through the primary traffic artery to provide for the frequent local transport needs of communities on either side of the primary traffic artery within the support elements of the archway;
4) archway within said cross street station and interchange having a dimension sufficient to for automotive, community transit vehicle, community-based paratransit vehicle movement along said primary traffic artery beneath the archway and support elements to each side of the local traffic artery that help to frame the boarding and disembarking area for community transit vehicles and vertical transport structures and equipment;

5) vertical transport structures and equipment including exterior stairways, interior staircases, escalators, and elevators for pedestrians between the street level and upper level where the lobby, regional mass transit platform, and pedestrian-oriented shared-use bridge can be found;

6) enclosed lobby area for a mix of retail uses, regional mass transit ticket purchasing facilities and equipment, refreshments, snacks, reading materials, TV, other entertainment opportunities, electronic access and Wi-Fi for use of computing devises and smart phones, such that the lobby is also arranged as a comfortable regional mass transit waiting area that spans the archway and its support elements at said upper level of the cross street station and interchange above the local traffic artery;

7) regional mass transit platform initially located at an upper level of the cross street station and interchange adjacent to the lobby for placement of pre-ticketed boarding passengers on the regional mass transit platform before lowering to the regional mass transit vehicle floor height upon arrival at the regional mass transit stop in the outer lane of the primary traffic artery;

8) large windows, doorways, and balconies on the upper level of the cross street station and interchange to view the surrounding community, community facilities traffic arteries, and approaching regional mass transit, metropolitan mass transit, community transit vehicles and community-based paratransit vehicles;

9) A covered waiting area for community transit vehicle or community-based paratransit vehicle passengers immediately adjacent the boarding and disembarking area for community transit vehicles and community-based paratransit vehicles;

10) wide sidewalks along the local traffic artery where a sidewalk might have an initial sidewalk segment with a lower elevation relative to the local traffic artery and a second sidewalk segment with a higher elevation than the first sidewalk segment along the local traffic artery such that bicycle traffic at speeds approximately 4 to 8 miles per hour can share this initial sidewalk segment with pedestrians who are walking at faster speeds and who intermittently give right-or-way to bicyclists; and, 11) a local traffic artery with sidewalks adjacent to the local traffic artery and mixed-use and community destination buildings adjacent the sidewalks forming a substantially continuous wall of structure with arcades, awnings, façade, entry improvements, landscaped sidewalks, and hardscape improvements.

Further, this cross street station and interchange operates in an urban environment where the following transportation systems exist and their stops and regional mass transit platforms are operational and proximate within the cross street station and interchange:

1) local community transit services and community-based paratransit vehicles referenced collectively as local community transit services;
2) metropolitan mass transit; and,
3) regional mass transit.

Further, this cross street station and interchange operates best where a plaza has been developed at one or each end of the local traffic artery and plaza or plazas have been improved to enhance pedestrian movements, accommodate bicycle, local community transit services, and to limit automotive travel.

Further, this cross street station and interchange will be used by regional visitors to the communities if abundant structured parking is available near plazas, the local traffic artery, the primary traffic artery, and the mass transit stations and stops. Pedestrian activity and use of adjacent transit opportunities will increase if liner buildings with arcades, awning and adjacent sidewalks with landscaping, hardscape, and other pedestrian-oriented features are developed around the parking areas similar to those associated with the local traffic artery.

The cross street station interchange presents itself as a gateway feature into one or both local communities. With a more acute turning radii at the traffic artery intersection then typical for a primary traffic arteries and a well-defined structure constructed to closely frame the narrowed lanes of the local traffic artery as traffic enters or leaves the community, traffic from the primary traffic artery that bisect two communities is discouraged from turning into the communities from the primary traffic artery at this location cross street station and interchange locations.

Further, the regional mass transit vehicles frequently block vehicular entry into and exiting the community via the local traffic artery and with the cross street station and interchange create a frequent barrier between the regional mass transit passengers and vehicular traffic. As vehicular traffic on the local traffic artery reduces, pedestrian safety and mass transit use increases, more pedestrian and bicycle movements occur, and land values increase so as to support mixed-use building construction.

So as to focus all or substantially all crossings between the two communities at one location, the cross street station and interchange facilitates safe regional mass transit and metropolitan mass transit access on a primary traffic artery and provides for three ways to safely cross the primary traffic artery: the pedestrian-oriented shared-use bridge, the local community transit services, and the at-grade street crossing improvements through the traffic artery intersection.

The cross street station and interchange lobby, vertical transport structures and equipment to move transit passenger from the street level to the lobby, and the pedestrian-oriented shared-use bridge located at the traffic artery intersection act individually and collectively, with at-grade safe intersection crossing improvements and community transit vehicles, as a fulcrum to leverage large-scale pedestrian movements that gather at the plaza, move along the local traffic artery to, up over, and through the primary traffic artery for access to multimodal transportation opportunities as well as destinations in the adjoining community. Events at a plaza act as an application force that moves residents and visitors from one side of the primary traffic artery to the other. As community leverage is applied, opportunities for enhanced transit access occurs as more widely dispersed populations and visitors from both communities aggregate at the traffic artery interchange for safe crossing of the primary traffic artery. Community populations act as if grains of sand that moves generally from one community to aggregated for passage through a narrow section of the hourglass. Once so aggregated, they tend to pass through the upper level to access regional mass transit or they pass through the pedestrian-oriented shared-use bridge to cross the primary traffic artery or in the alternative they are focused to cross the primary traffic artery in a narrowly defined at-grade safe crossing area that crosses the primary traffic artery or that are provided an alternative to use local community transit services to cross the primary traffic artery. Finally, while within this confined but safe, useful and comfortable area that is protected from the rail, wind, heat, sun and cold, community populations can also easily access metropolitan mass transit vehicles for destination within the metropolitan area. The entire apparatus acts as an inclined plane to move large numbers of residents and visitors from one community up, over and through the primary traffic artery obstacle to the other community and then back again and in so doing creating frequent access to mass transit use.

It is an object of the invention to provide a pedestrian-oriented, multi-level, multi-modal transit station of modest size and local traffic artery that facilitates large-scale pedestrian-oriented movements and improved regional transit access at the intersection of a congested primary traffic artery for access metropolitan and regional destinations and destinations along the local traffic artery.

It is another object to provide a multi-modal station which assists in the integration of otherwise disparate socio-economic communities separated by larger multi-lane traffic arteries, railroads, canals or other geological obstacles or blocking features of the built environment.

A yet further object is to provide a pedestrian and multi-modal community focused transportation node useful to all members of a community.

Nothing as described herein would prevent a third or higher level of structure to be built above the upper level of the cross street station and interchange for any community or multi-modally related use.

The above and yet other objects and advantages will become apparent in the hereinafter set forth Brief Description of the Drawings, Detailed Description of the Invention and Claims appended herewith.

BRIEF DESCRIPTION OF THE INVENTION

DETAILED DESCRIPTION OF THE INVENTION

Figure 1:
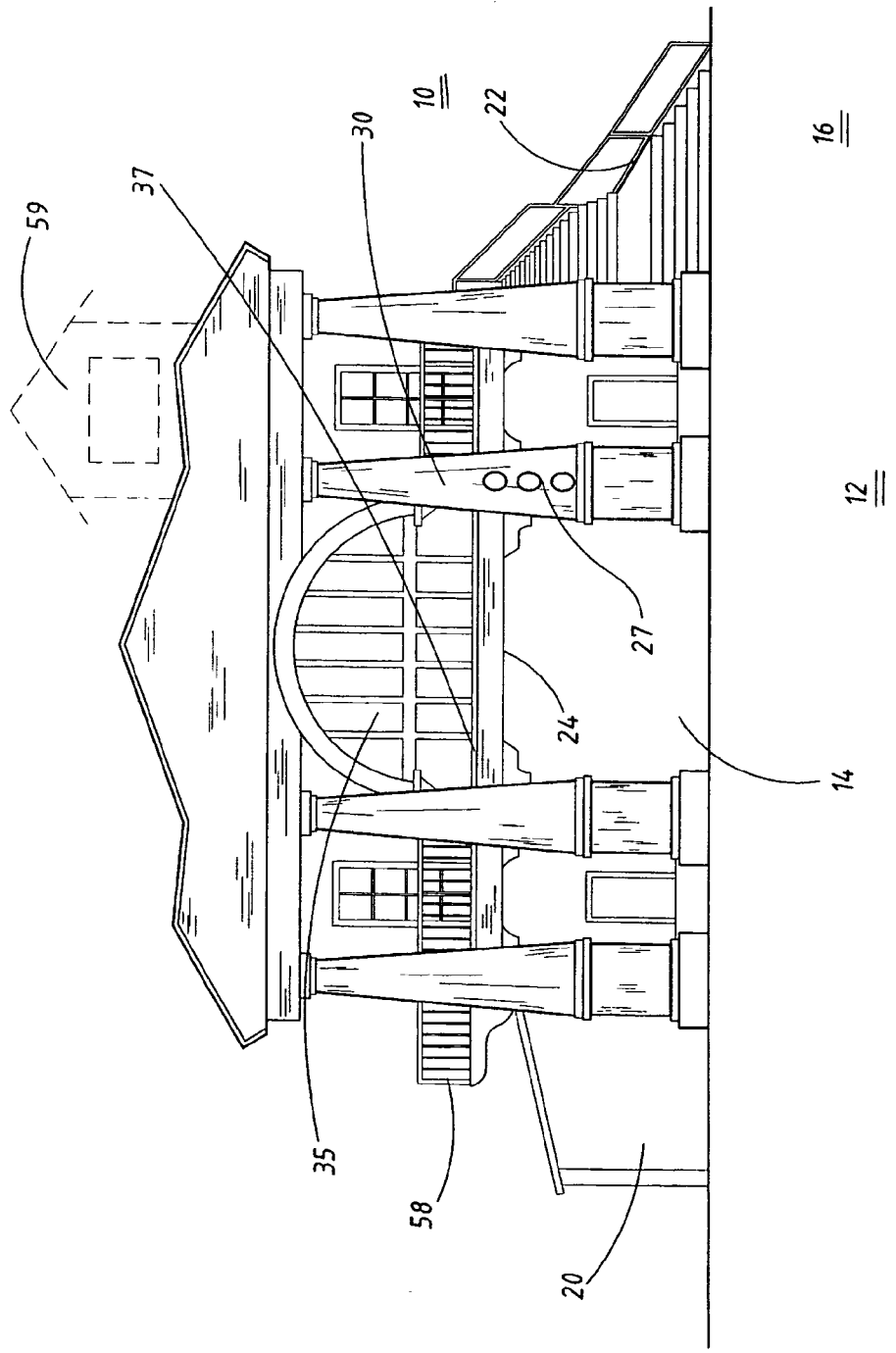
FIG. 1 is a front elevation view of the cross street station and interchange adjacent the traffic intersection of the primary traffic artery and the local traffic artery.
Figure 2:
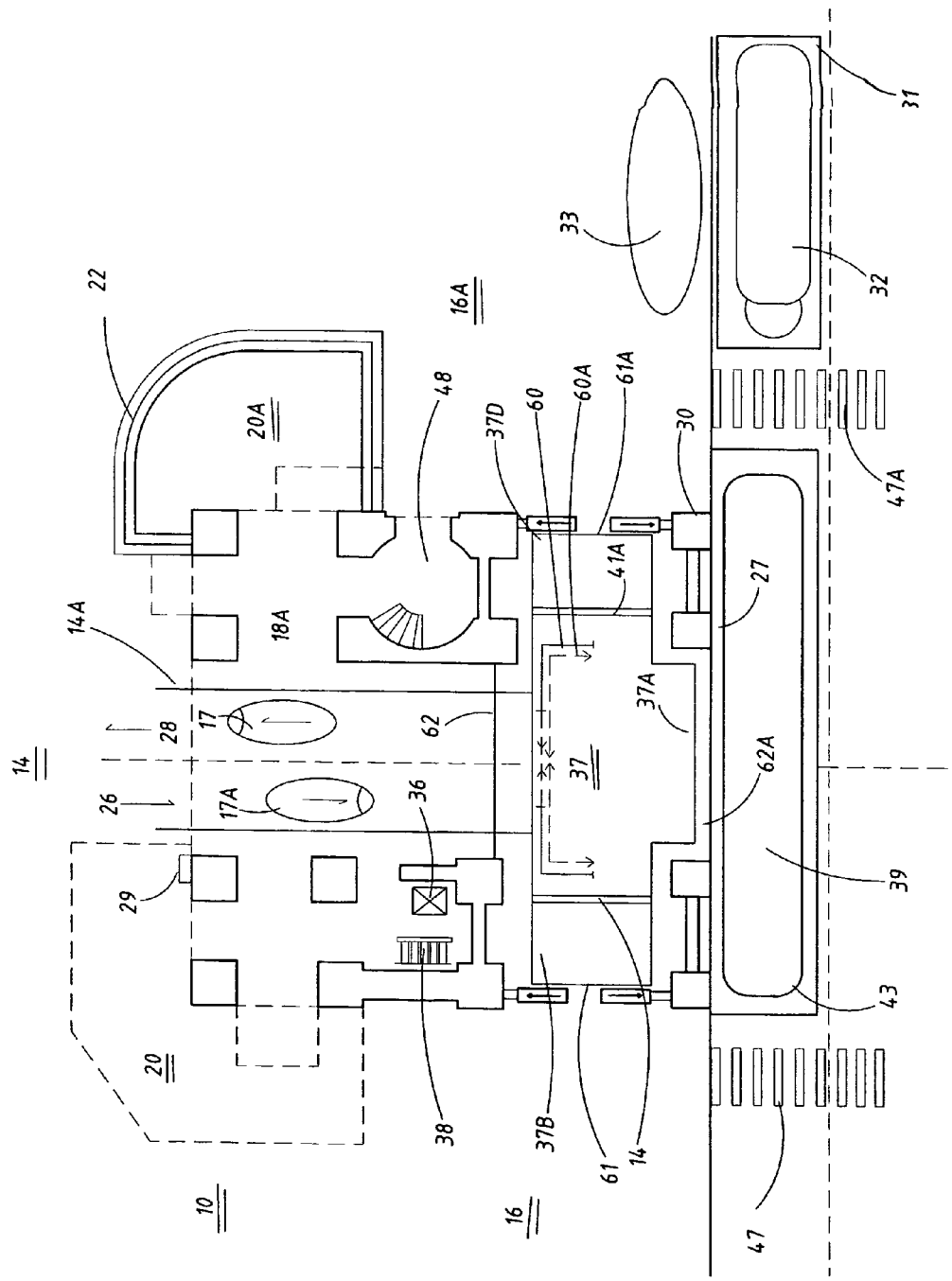
FIG. 2 is a ground level cross-sectional view thereof.
Figure 8:
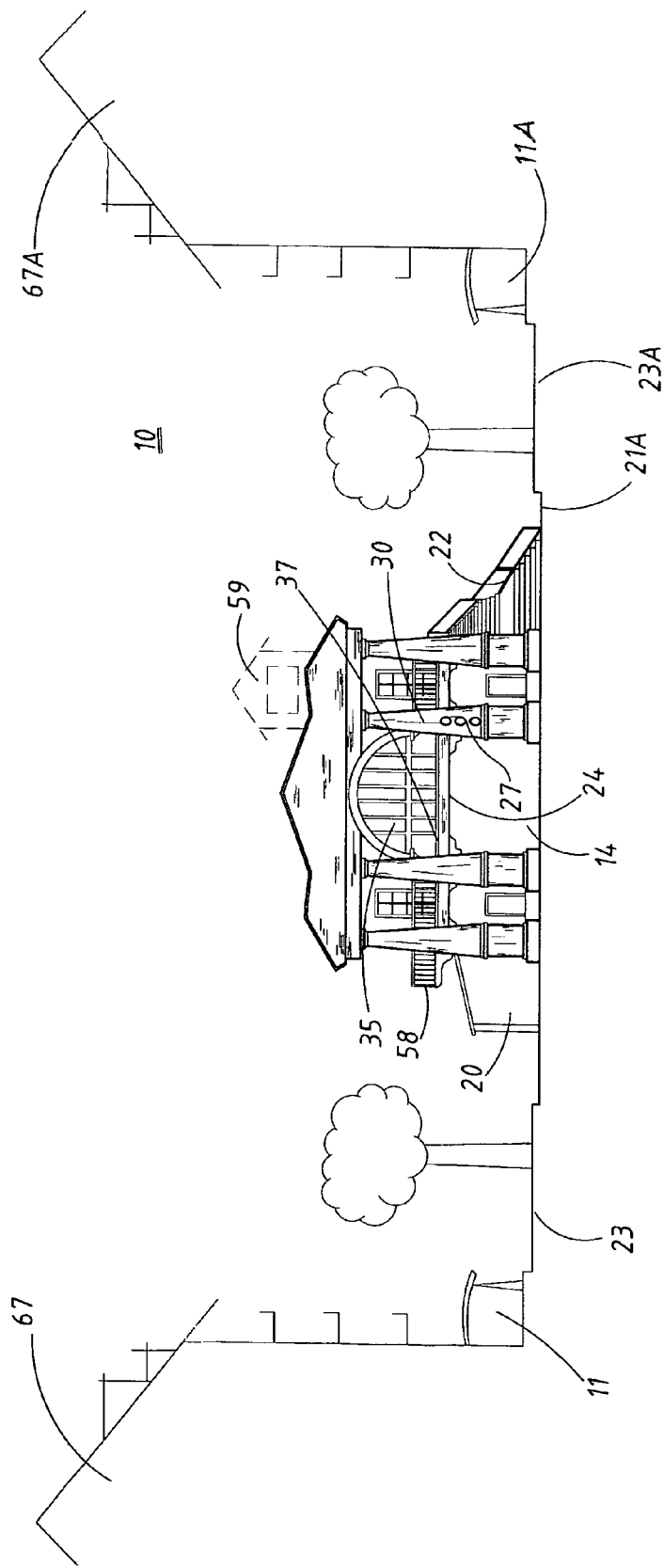
FIG. 8 is an enlarged view of the area surrounding FIG. 1.

With reference to the front elevation view of FIG. 1 and FIG. 8 and plan views of FIGS. 2, 3, 4, and 5, the present cross street station and interchange 10 may be seen as located at traffic artery intersection 12 between a local, pedestrian-oriented, and smaller two-lane street or local traffic artery 14/14A and a regional and larger multi-lane (i.e., 4 lanes of more) or primary traffic artery 16.

Figure 4:
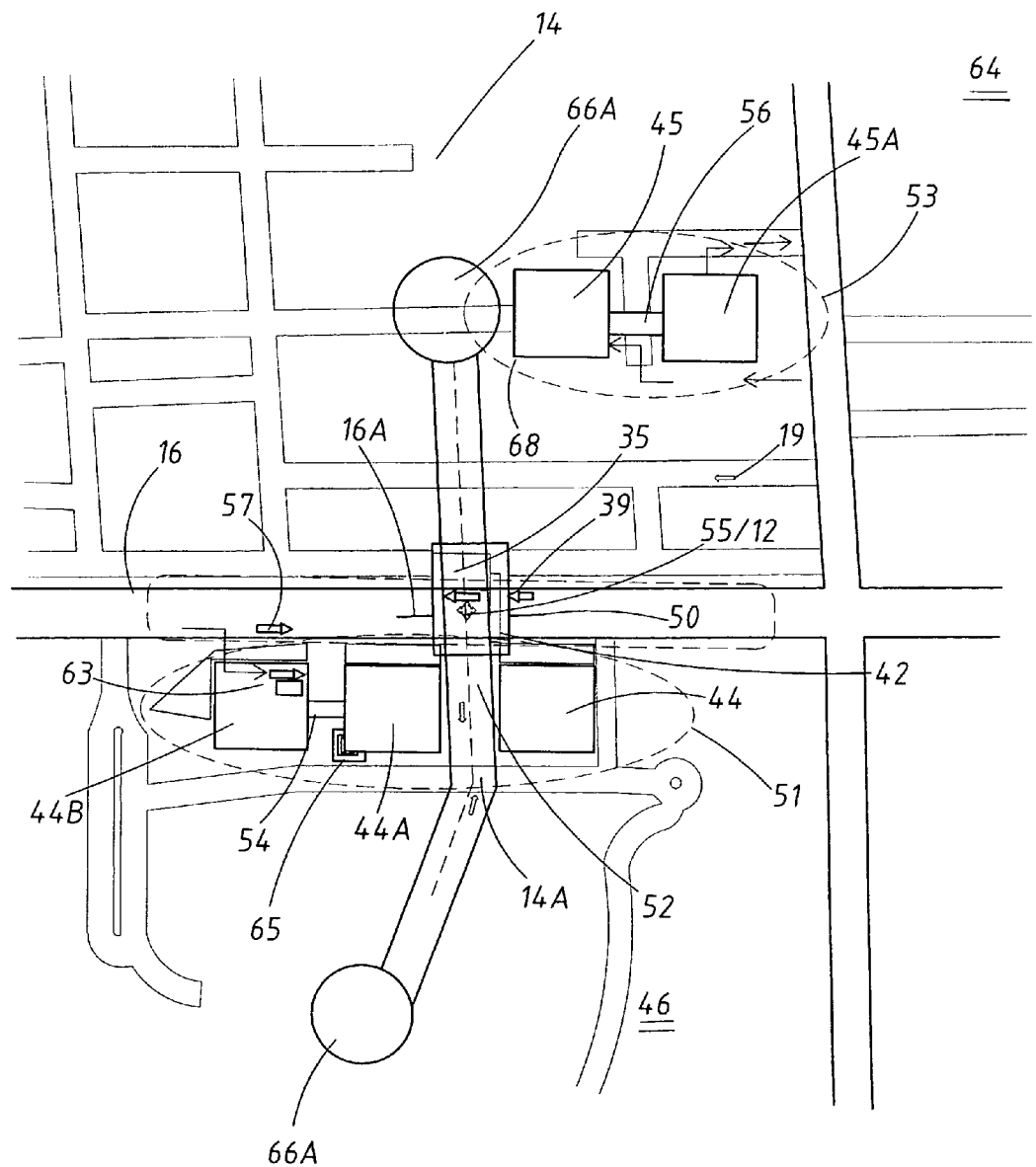
FIG. 4 is a schematic view of the cross street station and interchange and its surrounding community environment.
Figure 5:
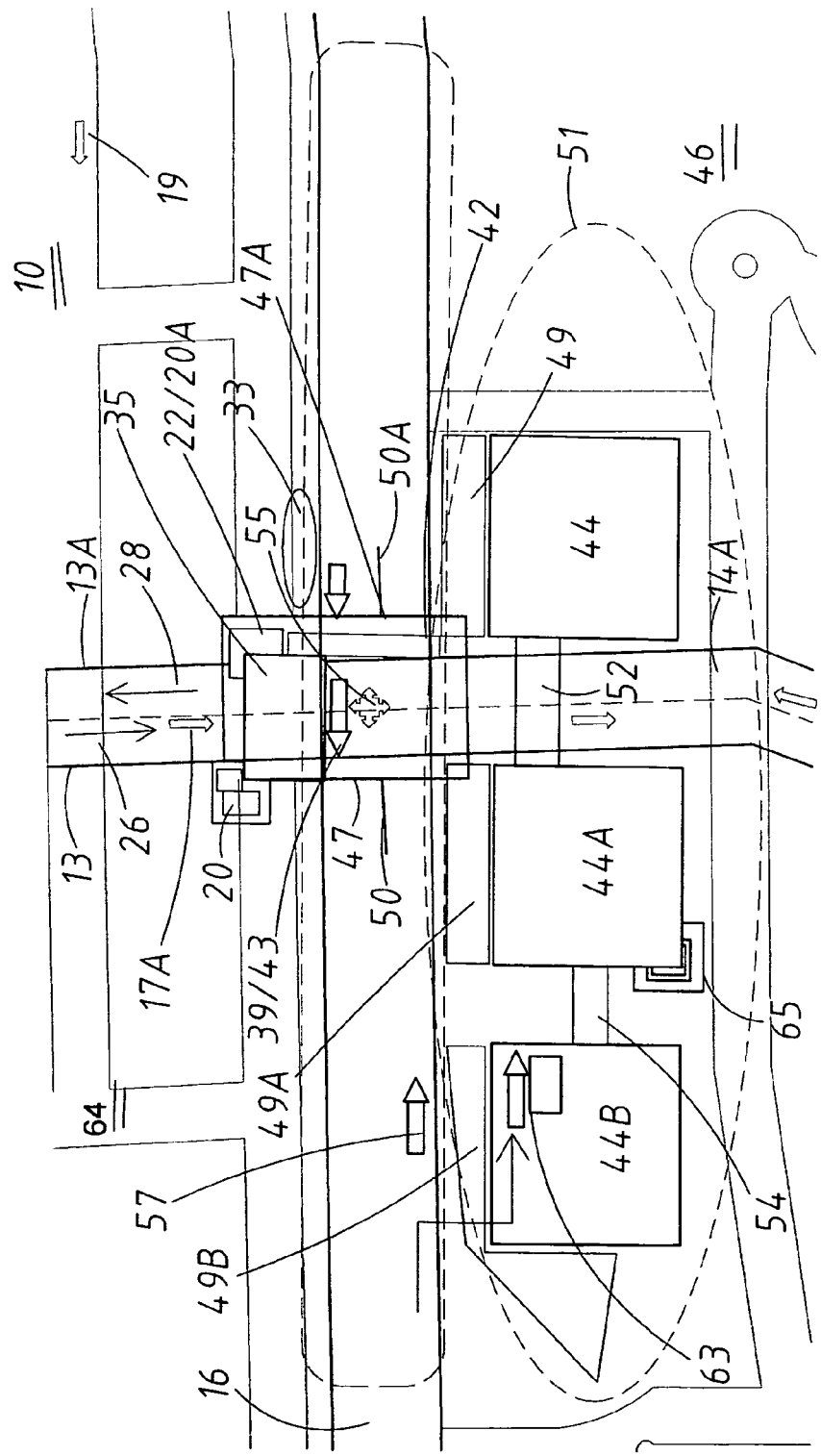
FIG. 5 is an enlarged schematic view of the traffic artery intersection of the primary traffic artery and the local traffic artery and the cross street station and interchange.

As depicted in FIGS. 4 and 5, the local traffic artery 14 is located within a substantially residential community area 64 and the local traffic artery 14A is located within the commercial or university campus community area 46. With various improvements for large-scale pedestrian movements, local traffic artery 14/14A may be viewed as a rigid rod or beam that pivots when populations from one community cross the primary traffic artery 16 to attend events and destinations in the other community. The lobby 34, regional mass transit platform 37, pedestrian-oriented shared-use bridge 42, community transit vehicles 17/17A, and safe street at-grade crossing improvements area 15 along the primary traffic artery 16 adjacent and within the traffic artery intersection 12 act as a fulcrum and the entire apparatus represents an inclined plane when an event at a plaza at the termini of the local traffic artery creates community engagement or applies input pressure that leverage populations up and over the primary traffic artery 16 obstacle. This beam and fulcrum function as a special social lever and inclined plane to ease and increase movement by residents and visitor from one community to the other and into mass transit vehicles. The pedestrian movements occur when the pedestrian-oriented conditions around the plaza, local traffic artery and transit stops area are attractive due to: the collective usefulness of local destinations; the comfort while walking regarding of the heat, cold, wind, sun and rail; safety from adverse conditions arising from speeding traffic or otherwise; the proximity of such walking movements within a specific corridor or area to the safe street at-grade crossing improvements area 15 defined across the primary traffic artery 16; and, the proximity of such walking movements within a specific corridor or area to various modes of mass transit that provide frequent, comfortable, reliable, and timely access to destinations within the region, the metropolitan area, and local communities.

Typically the communities on either side of the primary traffic artery 16 would be distinct; in this case one being a substantially residential community area 64 and the other being a commercial or university campus community area 46. The local traffic artery 14 functions as a pedestrian-oriented community 'main street" for a mix of uses within the substantially residential community 64 and will be more fully described herein with the understanding that some of the pedestrian-oriented elements discussed are ubiquitously present in the commercial or university campus community area 46. From a pedestrian point of view, there should be little differences between a local traffic artery 14 and local traffic artery 14A.

Such a local traffic artery 14 would be characterized as follows (see FIG. 4, FIG. 5, and FIG. 8):
1) each of the two lanes of traffic are narrowed to approximately 10 feet or less
2) one lane of traffic is for limited vehicular exit from the substantially residential community 64 (i.e., an egress traffic lane 26) and the other lane of traffic is for limited vehicular entry into the substantially residential community 64 (i.e., an ingress traffic lane 28) such that motorized vehicles and bicycles or other non-motorized vehicles may also use the egress traffic lane 26 to exit from the substantially residential community 64 and the ingress traffic lane 28 for entry into the substantially residential community 64
3) vehicular traffic speed on each lane of traffic does not exceed approximately 20 miles per hour or less
4) sidewalk 13 immediately adjacent the egress traffic lane 26 and outward of local traffic artery 12 and the sidewalk 13A immediately adjacent the ingress traffic lane 28 and outward of local traffic artery 12 are each fifteen feet or more wide with landscape and streetscape improvements adequate for bi-directional large-scale pedestrian movements (e.g., well-landscaped with large shade trees and various streetscape improvements that include human scale decorative lighting, benches, seating areas, fountains, public art, and similar improvements that are useful and attractive from a pedestrian point of view) with an initial sidewalk segment 21 within sidewalk 13 and an initial sidewalk segment 21A within sidewalk 13A immediately adjacent the local traffic artery 12 (see FIG. 8) having an elevation height of at least five inches higher than the local traffic artery with each initial sidewalk segment 21/21A being at least four feet wide and a second sidewalk segments 23/23A with a higher in elevation by at least five inches than the initial sidewalk segments 21/21A and such that the second sidewalk segment 23 is immediately adjacent the initial sidewalk segment 21 and the second sidewalk segment 23A is immediately adjacent the initial sidewalk segment 21A and both second sidewalk segments 23/23A lying further outward from the local traffic artery 12 such that the second sidewalk segments are at least 10 feet wide and such that one directional bicycle movements are allowed on the initial sidewalk segments 21/21A (i.e., in the same direction as the immediately adjacent egress or ingress traffic lane) and bicycle traffic is limited to speeds of 4 to 8 miles per hour on the initial sidewalk segments 21/21A so that the bicyclists can share this initial sidewalk segments 21/21A with pedestrians walking at faster speeds, walking in the same direction as the bicyclists, and who intermittently give right-or-way to bicyclists by stepping into the adjacent second sidewalk segments (i.e., either second sidewalk segment 23 or second sidewalk segment 23A) at an elevation higher than the initial sidewalk segments 21/21A;

5) a succession of distinctive looking mixed-use buildings 67/67A (see FIG. 8) that: are at least four stories high and upwards to approximately 6 stories in height; form a substantially continuous line of first floor retail storefronts, courtyards, and building entry areas at or proximate to the sidewalks 13/13A adjacent the local traffic artery 14, having a first floor ceiling height of approximately 15 feet or higher; possess a substantially continuous walking area under arcades and awnings within the wall of mixed-use and community destination buildings 67/67A such that this arcade and awning covered walking area 11/11A is approximately 15 feet or more wide and similar in height as the first floor uses to shelter pedestrians along the front of each building; have optically transparent or open windows and doorways and similar facade and entry features at the first floor; and, balconies, doorways, exterior stairways, operative windows, and similar façade and entry features at the second and higher floors To optimize pedestrian movements, the local traffic artery may have all elements of a two lane Ergonomic Hybrid Transit Access Corridor Particularly for Town and Urban Centers (see U.S. Pat. No. 6,561,727.

Plazas 66 would be positioned at significant destinations located in the substantially residential community area 64 at the termini of the local traffic artery 14. Plaza 66A would be positioned at a significant destination of the commercial or university campus community area 46 at the termini of local traffic artery 14A. The plazas would be characterized as having similar pedestrian-oriented improvements and in addition they would be large enough to be useful as venues for civic, market, educational, cultural, entertain or similar public events programmed to occur within such plaza structures and public space. See FIG. 4.

To show various in plaza alternatives, plaza 66 in substantially residential community area 64 has limited traffic transecting it for all or part of the day and the road surface continues past plaza 66 going away from the primary traffic artery 16, but without pedestrian-oriented elements. Plaza 66A in the commercial or university campus community area 46 has no traffic transecting it at any time of the day. Both have adjacent sidewalks 13/13A with shade streets (i.e., standing upright with a tree canopy that begins above 7 feet tall and extends outward from the tree trunk and pedestrian-oriented landscaping and hardscape improvements as described below.

Plaza 66 has sidewalk-like areas at least twice as wide and frequently wider when compared to the local traffic artery 14 and it has more limited vehicular traffic then a local traffic artery 14. Such plaza 66, therefore, has less vehicular conflicts or interactions with pedestrians and bicyclists and greater pedestrian-orientation than the local traffic artery 14. Plaza 66A is defined by the public space around a major destination within the commercial or university campus community area 46, is sized to be at least as large as plaza 66, and more or less the same distance from the traffic artery intersection 12 as plaza 66. See FIG. 4.

Vehicular movements at a plaza 66 can be limited by one or more of several means: vehicular speeds can be reduced to approximately 10 miles per hour or less; private passenger cars and trucks can be prohibited all together or during times of the day and early evening when pedestrian, bicycle, and local community transit services transport are most active; large commercial trucks can be prohibited; and, vehicular traffic can be limited to only a small subset of the area defined by the plaza 66 improvements. Even with these vehicular limitations community transit vehicles 17/17A and community-based paratransit vehicle 19 are allowed to be routed through the plaza 66 and to pick up and discharge passenger at the plaza 66. Community transit vehicle 17 is shown while operating within the egress traffic lane 26 of the local traffic artery 14 and community transit vehicle 17A is shown operating within the ingress traffic lane 28 of the local traffic artery 14. When they have reached the termini of the local traffic artery 14 they will return on the opposite direction such that community transit vehicle 17 operates within the ingress traffic lane 28 and community transit vehicle 17A operated within the egress traffic lane 26. The community-based paratransit vehicles travel throughout the local community streets to pick up identified transportation disadvantaged customers, but may transect plaza 66 or as needed the plaza 66A to use the local traffic artery 14 to access the cross street station and interchange 10 and to cross the primary traffic artery 16.

Bicycle movements occur within the local traffic artery 14 vehicular traffic lanes, frequently drafting in behind community transit vehicles 17/17A or within the sidewalks 13/13A areas immediately adjacent egress traffic lane 26, immediately adjacent the ingress traffic lane 28 and outward from the local traffic artery 14. Sidewalk 13/13A usage by bicyclists is based on an informal societal understanding that bicycles may use the sidewalks when the pedestrian crowds are reduced or when the bicyclist is quiet young and moving at pedestrian speeds with some adult guidance. More frequently, the bicyclist walks the bike through the pedestrian crowd associated with the plazas 66/66A and local traffic artery 14/14A.

By removing all known obstructions that would endanger or limit pedestrian and bicycle movements along the local traffic artery 14, a safe, useful, and comfortable walking environment is established that protects pedestrians from the wind, rain, heat, and cold. The capacity for community-wide pedestrian, bicycle, community transit vehicles 17/17A and community-based paratransit vehicles 19 movements from the plazas 66/66A along the local traffic artery 14/14A and through the primary traffic artery 16 that separates the two communities is controlled at the traffic artery intersection 12 of the cross street station and interchange 10 that links the two adjacent communities together at both the street level and upper level 35.

As all community wide pedestrians, bicyclists, and community transit vehicles 17/17A users pass through the improve traffic artery intersection 12, they are provided proximate access to regional mass transit vehicle 39, metropolitan mass transit vehicle 32 and community transit vehicles 17/17A arriving on a frequent schedule. Because plazas 66/66A are configured as public spaces where the various improvements for large-scale pedestrian movements are more expansive (see FIG. 4), they and the events programmed therein attract larger numbers of people and that provides the pressure to move more community residents and visitors first to one direction and then the opposite direction up, over and through the primary traffic artery 16 between two communities (i.e., the commercial or university campus community area 46 and the substantially residential community area 64).

Intermodal transfers to regional mass transit at lobby 34 and regional mass transit platform 37 can occur when the pedestrian's or bicyclist's destination can be reached by regional mass transportation in combination with pedestrian, bicyclist, or similar community transit vehicle trip segments that begin or end at the cross street station and interchange 10 and especially if similar pedestrian-oriented trip segments are available at the other regional mass transit station. This will occur more frequently in the presence of an Informer Traveler Program and Applications (see our application Ser. No. 13/847,024).

The local traffic artery 14 within the substantially residential community area 64 may be also used by community transit vehicles 17/17A, community-based paratransit vehicle 19, and local automotive traffic. One traffic lane of local traffic artery 14 is used as a egress traffic lane 26 out of the substantially residential community 64 and onto the primary traffic artery 16 or into the commercial or university campus community area 46 and the other traffic lane is used as a ingress traffic lane 28 into the substantially residential community area 64 from the primary traffic artery 16 or the commercial or university campus community 46. Generally, similar egress and ingress traffic lanes exist on local traffic artery 14A within the commercial or university campus community area 46.

Community transits vehicle 17/17A are used for transporting community transit vehicles 17/17A passengers along said local traffic artery 14 to the cross street station and interchange 10, through the traffic artery intersection 12, or to other community destinations and parking structures. Intermodal changes to regional mass transit at the lobby 34 and regional mass transit platform 37 of the cross street station and interchange 10 will occur when the community transit vehicles 17/17A passenger's destination can be reached by regional mass transit in combination with a pedestrian, bicyclist, or similar community transit vehicle trip segments that begins or ends at the cross street station and interchange 10, especially if similar trips segments are available at the other regional mass transit station. This will occur more frequently in the presence of an Informer Traveler Program and Applications (see our application Ser. No. 13/847,024).

Community-based paratransit vehicle are used to transport the transportation disadvantaged along said local traffic artery 14 to the community transit boarding and disembarking area 18 and elevator 36 for vertical transport via the elevator 36 to the lobby 34 and regional mass transit platform 37 if the final paratransit trip destination is accessible by regional mass transit vehicle 39 or through the traffic artery intersection 12 if in the final paratransit destination in within the commercial or university campus community area 46. Intermodal changes to regional mass transit at the lobby 34 and regional mass transit platform 37 of the cross street station and interchange 10 will occur when the paratransit customer's destination elsewhere in the region and accessible by a regional mass transportation trip segment in combination with a similar community-based paratransit vehicle trip segment that begins at some other transit station or stop which is linked to the cross street station and interchange 10 by regional mass transit and is located in a community where the paratransit customer's destination can be found. This will occur more frequently in the presence of an Informer Traveler Program and Applications (see our application Ser. No. 13/847,024).

Local car and small truck traffic may travel on the local traffic artery 14, but this is discouraged by: the slow speed that is authorized (20 miles per hour or less), the narrow traffic lane widths (10 feet or less), the large pedestrian crowds that at times move into the traffic lanes, frequent use of the local traffic artery 14 by the slow moving community transit vehicles 17/17A which stop frequently to pick up and discharge passengers, and easy access to structured parking to facilitate modal shifts to pedestrian, bicycle and transit trip segments. The structured parking is available at the commercial or university campus garages 44/44A/44B adjacent the primary traffic artery 16 and at the residential community parking garages 45/45A adjacent the plaza 66A. Pedestrian activity and use of adjacent transit opportunities will increase if liner buildings with arcades and awnings and adjacent sidewalks are developed with pedestrian-oriented landscaping, hardscape, and other features in a manner similar to those associated with the local traffic artery 14 around the parking garages. Such a commercial or university parking garage pedestrian-oriented improvement area 51 surrounds the commercial or university campus garages 44/44A/44B and such a residential parking garage pedestrian-oriented improvement area 53 surrounds the residential community parking garages 45/45A. See FIG. 4. Commercial or university liner buildings 49/49A/49B are shown in the commercial or university campus community area 46 adjacent the commercial or university campus garages 44/44A/44B. See FIG. 5.

Further, from time to time such vehicular use of the local traffic artery 14 can be prohibited all together in order to allow the entire street to be used by pedestrians, bicyclists, community transit vehicles 17/17A, and community-based paratransit vehicles. As the height of the local traffic artery 14/14A is raised in subsequent resurfacing roadway improvements over the course of decades to avoid flooding first to the sidewalk height elevations 13/13A and then to the height elevation of the walking area under the arcade or awnings 11/11A of the mixed-use or community destination buildings in order to adapt to initial sea level rise conditions, more pedestrian, bicyclist, and community transit vehicle movements are expected with less automotive traffic.

Intermodal transfers to regional mass transit at the lobby 34 and regional mass transit platform 37 of the cross street station and interchange 10 occur when the cross street station and interchange 10 provides structured parking to motorists adjacent to the plaza 66/66A, lobby 34, or primary traffic artery 16 and the destination of the occupants of cars and small trucks can be reached by regional mass transit in combination with pedestrian, bicyclist, or community transit vehicle trip segments that begins and ends at cross street station and interchange 10, especially if similar pedestrian-oriented trip segments are available at the other regional mass transit station. This will occur more frequently in the presence of an Informer Traveler Program and Applications (see our application Ser. No. 13/847,024).

The primary traffic artery 16 may be used for longer distance car, larger truck, bus, and regional mass transit movements as well as short distance pedestrian trip segments and longer distance bicyclist's trips especially where a bike lane is positional with the traffic lanes. The faster the movement of the automotive traffic, the less distance pedestrians and bicyclists will be willing to walk or bike on a primary traffic artery 16 due to the hazardous traffic conditions created for the faster and more congested vehicular traffic.

A community transit boarding and disembarking areas 18/18A (see FIG. 2) are used by community transit vehicles 17/17A and community-based paratransit vehicle 19 passenger who board and disembark from the sidewalk 13/13A of the local traffic artery 14. Community transit boarding and disembarking areas 18/18A are located adjacent to a community transit waiting areas 20/20A, furthest from the traffic artery intersection 12, beneath lobby 34, and lying to one side of the primary traffic artery 16. See FIG. 3. The community transit waiting area 20 is adjacent to the community transit boarding and disembarking area 18 and community transit waiting area 20A is adjacent to the community transit boarding and disembarking area 18A.

Community transit boarding and disembarking area 18 is used by passengers boarding the community transit vehicles 17/17A and community-based paratransit vehicle 19 within the egress traffic lane 26. Community transit boarding and disembarking area 18A is used by passengers boarding the community transit vehicles 17/17A and community-based paratransit vehicle 19 within the ingress traffic lane 28.

The community transit boarding and disembarking areas 18/18A lies at street level within the archway 24 support elements. It has open egress and ingress to the sidewalks 13/13A of the local traffic artery 14, traffic artery intersection 12, the metropolitan mass transit waiting area 33, the exterior stairway 22, and interior staircase 48, elevator 36, escalator 38 for access to the lobby 34 and regional mass transit platform 37 of the cross street station and interchange 10. The community transit waiting areas 20/20A in whole and part is covered by arcade, awning or the like or is underneath exterior stairway 22.

The exterior stairway 22 extends from the sidewalk of the local traffic artery 14 to the upper level 35 and lobby 34 of the cross street station and interchange 10. It is typically located adjacent and proximate to the metropolitan mass transit waiting area 33 (see FIG. 2) and the community transit waiting area 20A is typically beneath the exterior stairway 22. By this mean, the multimodal customers can use the exterior staircase 22 to view arriving metropolitan mass transit vehicle 32 and regional mass transit vehicle 39. An additional exterior stairway can be located on the other side of the local traffic artery 14, but more frequently due to costs and site size constraints, an extended arcade or awning is used to cover community transit waiting area 20.

The community transit waiting areas 20/20A and community transit boarding and disembarking areas 18/18A are very proximate to the lobby 34, regional mass transit platform 37, exterior stairway 22, lobby 34, elevator 36, escalator 38, interior staircase 48, and metropolitan mass transit waiting area 33. This proximate location between community transit boarding and disembarking area 18/18A, metropolitan mass transit waiting area 33, and regional mass transit platform 37 is configured to ease intermodal transfers in as small a place as possible and to provide for regional mass transit vehicle 39 passengers an upper level 35 above the traffic artery intersection 12, primary traffic artery 16, and local traffic artery 14. The specific arrangements of these intermodal transfer elements of the cross street station and interchange 10 can be varied based upon actual site conditions.

This upper level 35 elevation, with the doorways, windows, balconies 58/58A, exterior stairway 22, and interior staircase 48 of cross street station and interchange 10, all provide important lines of sight to approaching transit vehicles and views to the community on both sides of the primary traffic artery 16. Further, the elevation of the upper level 35 provides for important intermodal operational separation between the transit passengers who approach and depart from the cross street station and interchange 10 and the hazardous vehicular traffic on the primary traffic artery 16. Like plazas 66/66A, all the elements of this cross street station and interchange 10 provides pedestrian-oriented spaces that are useful, safe, and comfortable and public space that protects pedestrians from the wind, rain, heat and cold. In addition, the cross street station and interchange 10 provides for proximate, easy, frequent, safe and attractive access to regional mass transit vehicles 39 and metropolitan mass transit vehicles 32 that are operating on the primary traffic artery 16 proximate to the cross street station interchange 10. Use of the lobby 34 and exterior stairways 22 as a venue for events that are interesting and fun will increase transit use.

Proximal to the community transit vehicle boarding and disembarking areas 18/18A is an archway 24 having a dimension sufficient to accommodate two-directional two lane traffic upon said local traffic artery 14 and related turning lanes if such are desired and support elements that incorporates areas for the community transit boarding and disembarking areas 18/18A and vertical transport structures and equipment so as to establish a community gateway to demark and limit ingress and egress from the substantially residential community 64.

Figure 3:
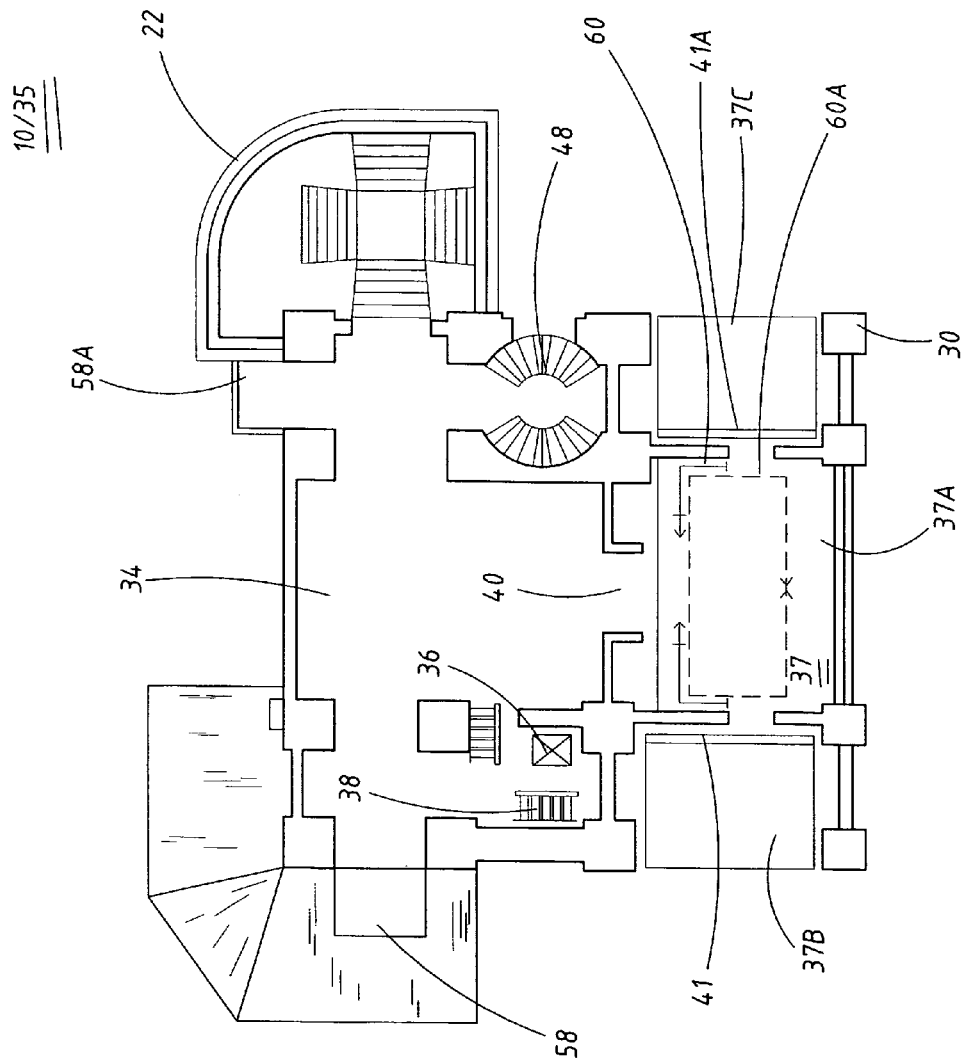
FIG. 3 is a second floor cross-sectional view thereof.

Retail stores, regional mass transit ticketing and passenger waiting area of lobby 34 and a regional mass transit platform 37 are provided at the cross street station and interchange 10 upper level 35 (see FIG. 3). After ticket purchases and immediately prior to regional mass transit arrival, passengers are asked to assemble on the regional mass transit platform 37 after passing through the platform turnstile or doorway entry 40 opened by the platform attendant.

The regional mass transit platform 37 is composed of three sections; a central platform section 37A, a ramp platform section 37B hinged to one side of the central platform section 37A, and a ramp platform section 37C hinged to the other side of the central platform section 37A. Ramp platform section 37B attaches to one side of central platform section 37A with a flexible hinge mechanism 41 and the ramp platform section 37C attaches to the other side of central platform section 37A with a flexible hinge mechanism 41A. See FIG. 2, FIG. 3, FIG. 6, and FIG. 7.

The central platform section 37A comprises over half the total area of the regional mass transit platform 37 surface area and includes an area defined by an interior platform caging mechanisms 60/60A that encloses more than half the central platform section 37A. The boarding passengers stand within the interior platform caging mechanisms 60/60A while the regional mass transit platform 37 lowers to the regional mass transit vehicle 39 at the regional mass transit stop 43 within the outer lane of the primary traffic artery 16. Interior platform caging mechanism 60 opens to the lobby 34 and interior platform caging mechanism 60A opens to the regional mass transit vehicle 39. See FIG. 2 and FIG. 3.

This passenger standing area as encircled by the interior platform caging mechanisms 60/60A comprises approximately more than half of the area of the central platform section 37A and this area is located nearest the lobby 34 (see FIG. 3). Before the passengers first enter the regional mass transit platform 37, the platform attendant will have opened the interior platform caging mechanism 60 facing the lobby 34 so that passengers can enter from the lobby 34 and the platform attendant will close the interior platform caging mechanism 60 after all passengers have assembled on the regional mass transit platform 37 for it decent to the regional mass transit vehicle 39. See FIG. 3.

Before the regional mass transit platform 37 descends, traffic light control signals 27/29 and the street crossing gates 25 cycles downward to indicate to all vehicular traffic to stop so that no vehicular traffic may enter the area where the regional mass transit platform 37 will descend. The traffic light control signals at the traffic intersection 12 also cycle to prohibit any vehicular traffic from entering the local traffic artery 14 under the regional mass transit platform 27 or archway 24. As the regional mass transit platform 37 descends with its passengers and platform attendant from the upper level 35 to the level that is the same height as the passenger floor of the arriving regional mass transit vehicle 39 (see FIG. 2, FIG. 6 and FIG. 7), passengers and the platform attendant stay within the area defined by the interior platform caging mechanisms 60/60A.

If a safety issues requires, a movable exterior enclosure wall or exterior platform caging mechanisms 62/62A positioned outwardly from the regional mass transit platform 37 and extending downwardly from the upper level 35 floor elevation will descend within the local traffic artery 14 before the decent of the regional mass transit platform 37 to secure the area under the regional mass transit platform 37 within the local traffic artery 14. Exterior platform caging mechanism 62 secures the local traffic artery 14 right of way furthest from the primary traffic artery 16 and the exterior platform caging mechanism 62A secures the local traffic artery 14 right of way closest to the primary traffic artery 16. See FIG. 2 and FIG. 3 Within such exterior platform caging mechanism 62A, a doorway is provided to allow access to and from the regional mass transit vehicle 39.

The regional mass transit platform 37 is timed to be lowered just after the arrival of the regional mass transit vehicle 39. When the regional mass transit platform 37 arrives at the prescribed regional mass transit vehicle 39 floor height elevation, the platform attendant will open the interior platform caging mechanism 60A and any exterior platform caging mechanism 62A adjacent any arriving regional mass transit vehicle 39 as the vehicle doors open and direct those passenger disembarking to the left to use the ramp platform section 37B to exit to the local traffic artery 14 sidewalk 13 adjacent egress traffic lane 26 through the exterior platform turnstile or doorway exit 61 and direct those passenger disembarking to the right to use the ramp platform section 37C to exit to the local traffic artery 14 sidewalk 13A adjacent the ingress traffic lane 28 through the exterior platform turnstile or doorway exit 61A.

If safety issues require, the wall in which the exterior platform turnstile or doorway exits 61/61A are installed may extend to the upper level 35. For added security, in the area between the two columns or other such archway 24 support elements at each end of the archway 24 and support elements there may be installed fixed glass, acrylic glass, or similar material in the area where the regional mass transit platform 37 descends from upper level 35 to street level.

Once the disembarking passengers have cleared the central platform section 37A, the platform attendant will direct boarding passengers on the central platform section 37A to step forward into the regional mass transit vehicle 39. When the boarding passengers have all entered the regional mass transit vehicle 39, the regional mass transit vehicle will quickly close its doors and depart. Thereupon, the platform attendant will close the interior platform caging mechanism 60A, any exterior platform caging mechanism 62A doorway, and ascend in the regional mass transit platform 37 to the upper level 35 to repeat the process for the next arriving regional mass transit vehicle.

After the regional mass transit platform 37 ascends followed by any exterior platform caging mechanisms 62/62A, the traffic light control signals 27/29, street crossing gates 25, and traffic light control signals at the traffic artery intersection 12 can cycle to allow automotive traffic to begin to move again within local traffic artery 14.

Figure 6:
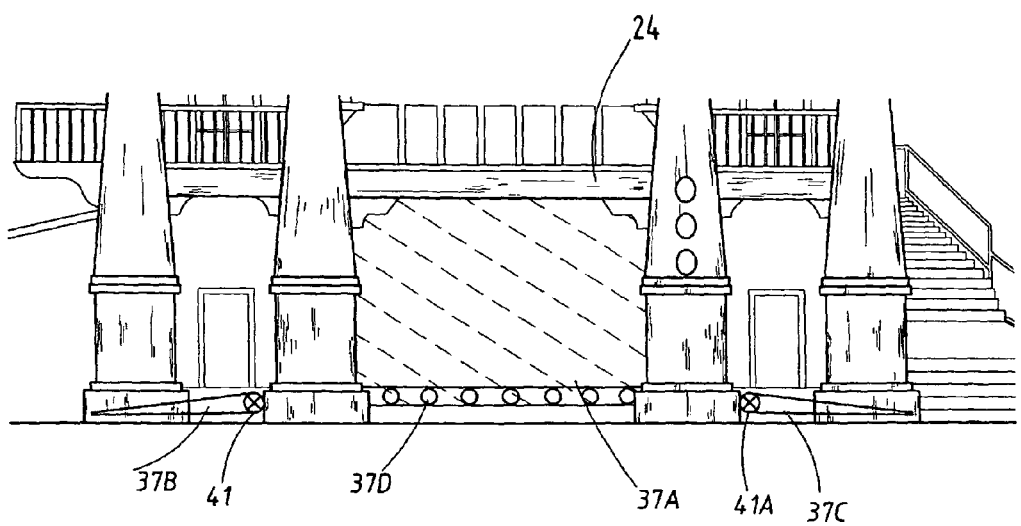
FIG. 6 is a more detailed front elevation view of the street level when the regional mass transit platform has been lowered from the upper level within the cross street station and interchange to receive passengers from a regional mass transit vehicle arriving on the primary traffic artery that possesses a low vehicle floor elevation height.
Figure 7:
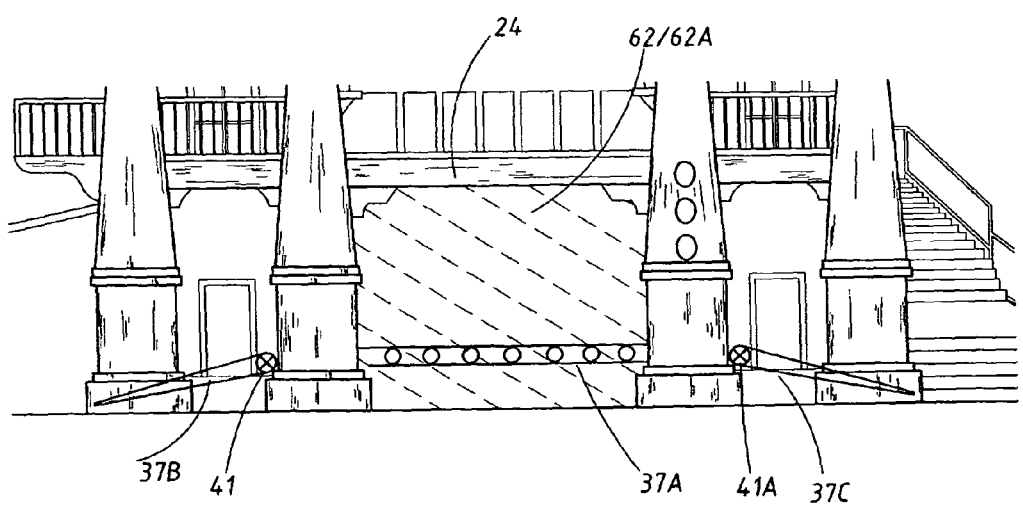
FIG. 7 is a more detailed front elevation view of the ground or street level when the regional mass transit platform has been lowered from the upper level within the cross street station and interchange to receive passengers from a regional mass transit vehicle arriving on the primary traffic artery that possesses a higher vehicle floor elevation height.

FIG. 6 depicts a height of the regional mass transit platform 37 when it has descended to a low regional mass transit vehicle floor height and FIG. 7 depicts a height of the regional mass transit platform 37 when it has descended to a slightly higher regional mass transit vehicle floor height. In each case, the ramp platform sections 37B/37C have the flexibility due the hinging mechanisms 41/41A to allow the ends of the ramp platform sections 37B/37C to come to rest at a level equal to that of the local traffic artery 14 sidewalks 13/13A and proximate to the edges of the sidewalk 13 adjacent egress traffic lane 26 and the sidewalk 13A adjacent ingress traffic lane 28 regardless of small difference in height (i.e., a foot of les) as to various regional mass transit vehicles arriving at the cross street station and interchange 10.

The platform operator controls the exterior platform caging mechanisms 62/62A and operating system to lower the regional mass transit platform 37 to a desired height based on knowledge of what floor height the regional mass transit vehicle 39 possesses. The platform operator selects the appropriate level for the regional mass transit platform 37 to descent and to some degree any minor adjustments to this leveling of the regional mass transit platform 37 to regional mass transit vehicle 39 floor height is automated within the platform operating system. In addition, the opening of the interior platform turnstile or doorway entry 40, exterior platform turnstile or doorway exits 61/61A, and interior platform caging mechanisms 60/60A can be automated within the platform operating system so that the steps necessary to board and disembark (e.g., platform turnstile and door entry opening, caging, and platform descent and return) are simplified and the execution of the boarding and disembarking steps by the platform attendant is perfunctory.

Traffic on the local traffic artery 14 are safely positioned below the upper level 35 of the cross street station and interchange 10 and such traffic waits behind: the egress traffic light control signals 29 displayed on the archway 24 support elements adjacent the egress traffic lane 26 and facing the traffic traveling on the egress traffic lane 26; and, the street crossing gates 25 under the archway 24 while the regional mass transit platform 37 is lowered to the regional mass transit vehicle 39 floor level.

The regional mass transit platform 37 has warning lights 37D affixed to its edge facing the primary traffic artery 16 and ingress traffic light control signals 27 are attached the column 30 to warn vehicle drivers on the primary traffic artery 16 not to attempt to enter the local traffic artery 14 under the archway 24 during the time the regional mass transit platform 37 is being lowered or raised. See FIG. 6 and FIG. 7. These are in addition to the intersection traffic light control signals that would indicate to such turns were not permitted through most hours of the day when regional mass transit vehicles made frequent stops at the cross street station and interchange 10.

Further, when the regional mass transit platform 37 is lowered, it fully for most of that time fully blocked by with the regional mass transit vehicle 39 from view of traffic on the primary traffic artery 16 and therefore the entry into the local traffic artery 14 during regional mass transit passenger unloading and loading is not possible.

Finally, until the regional mass transit platform 37 is raised back to the upper level 35, traffic from the primary traffic artery 16 or from the local traffic artery 14 cannot turn into the local traffic artery 14 beneath the archway 24 because this regional mass transit platform 37, approximately 50 feet across in total length, clearly blocks there entry much as a drawbridge in some ancient castle would block ingress at times thought appropriate.

Column 30 or similar support elements for the archway 24 and upper level 35 help to define the face of the cross street station and interchange 10 as a gateway and barrier facing outward to the primary traffic artery 16 and protecting the more pedestrian public spaces within and around the cross street station interchange 10 and local traffic artery 14. Column 30 and similar support elements for archway 24 and upper level 35 provide a supporting edge to the regional mass transit platform 37.

The bottom step of the exterior stairway 22 and the community transit waiting area 20A is within to the sidewalk 13A adjacent to the ingress traffic lane 28 of the local traffic artery 14 that expands to a width extending to the metropolitan mass transit waiting area 33 and to the beginning of the street crossing strip 47A across the primary traffic artery 16 (i.e., one of the at-grade pedestrian safety improvements installed in the safe at-grade street crossing improvements area 15). The community transit waiting area 20 and any additional exterior stairway overhead are within the sidewalk 13 adjacent the egress traffic lane 26 that expands to a width extending to the beginning of the street crossing strips 47 across the primary traffic artery 16 (i.e., one of the at-grade pedestrian safety improvements installed in the safe street at-grade crossing improvements area 15). In the absence of an additional exterior stairway, the community transit waiting area 20 has an awning or arcade to cover it or substantially cover it.

These at-grade safe street crossing improvements are collectively identified within an safe street at-grade crossing improvements area 15 and they tend to slow traffic as it approaches the traffic artery 12, reduce the traffic to turns and the speed of those turns from the primary traffic artery 16 into the local traffic artery 14, and eliminate deadly at-grade contact by any vehicle in traffic with pedestrians and bicyclists within the traffic artery intersection 12.

The at-grade pedestrian safety improvements installed in the safe street at-grade crossing improvements area 15 of the primary traffic artery 16 are: traffic lanes narrowed to 11 feet for 1000 feet before reaching the traffic artery intersection 12; the road texture along the length of the primary traffic artery 16 where traffic lanes are narrowed are made more rough to produce a noticeable tire sound and vehicle shake at higher that 20 mile per hour speed; the traffic artery intersection 12 raised to the height of the sidewalks 13/13A adjacent such traffic arteries; highly visible crossing strips 47/47A across the primary traffic artery 16 on the roadway surface adjacent the traffic artery intersection 12 to demark an area where pedestrian cross the primary traffic artery 16 (i.e., 10 feet wide or more); large medians 50/50A positioned between opposing traffic lanes of the primary traffic artery 16 (i.e., 10 feet wide or wider and 30 feet long or longer) such that the median 50 is transected by crossing strips 47 across its width and centered within its length and median 50A is transected by crossing strips 47A; shade trees within the median positioned such that at least two of those shade trees are separated by the pedestrian crossing strips areas within the median 50 and at least two of those shared trees are separated by the pedestrian crossing strips within median 50A and these shades trees in each of the medians are positioned towards one of the respective ends of the respective medians along its length; pedestrian and bicyclists activated traffic artery intersection traffic light control signals 55 at the traffic artery intersection 12 that are larger than typical and in the clear line of sight for all traffic vehicle occupants at or approaching the traffic artery intersection 12; and, a space within the traffic artery intersection 12 that is constrained so as to provide for a 90° turning radii for automotive traffic seeking to turn into the local traffic artery 14 from the primary traffic artery 16; and, other safe street improvements that tend to slow traffic as it approaches the traffic artery intersection 12 or when traffic in the primary traffic artery 16 turns into traffic artery 14 for ingress into the substantially residential community 64 as set forth herein.

Similar safety improvements can be applied to the pedestrian-oriented local traffic artery 14 throughout it length from the plaza or other destination building termini and where pedestrians are frequent and sidewalks 13/13A, landscaping, hardscaping, and mixed use building are adjacent the local traffic artery 14.

The metropolitan mass transit stop 31 for the metropolitan mass transit vehicle 32 is located adjacent the metropolitan mass transit waiting area 33 and it is within the traffic artery intersection 12 before arriving at the area demarked with crossing strips 47A across the primary traffic artery 16 that demarks a pedestrian crossing area and behind the regional mass transit stop 43 that is located between the two crossing strips 47/47A that span across the primary traffic artery 16. See FIG. 2, FIG. 4, and FIG. 5.

At the upper level 35 of the cross street station and interchange 10 is a lobby 34 together with an elevator 36, an escalator 38, exterior stairway 22, and interior staircase 48 (see FIG. 3). Waiting area 34 further includes a turnstile or doorway entry 40 leading to the regional mass transit platform 37. From the lobby 34, one may also exit the entire upper level 35 of the cross street station and interchange 10 and proceed therefrom onto a pedestrian-oriented shared-use bridge 42 (see FIG. 3, FIG. 4 and FIG. 5) which passes over and across primary traffic artery 16 and therefrom one may proceed to the street level either by way of another cross street station and interchange on the other side of the primary traffic artery 16 as shown in FIG. 5 by way of or such mixed-use and community destinations within the commercial or university liner building 49, adjacent commercial or university parking garage 44, and ramps, stairways or other such structures or destinations within a commercial or university campus community area 46 across the primary traffic artery 16. As shown in FIG. 5, the commercial or university parking garage 44 can connect to further bridge 52 to commercial or university parking garage 44A and from there a pedestrian can descend to the second regional mass transit stop 63 and associated regional mass transit vehicles and waiting area via the second exterior stairway 65. At any time, pedestrians can descend from these commercial or university liner buildings 49/49A/49B and commercial or university parking garages 44/44A/44B to access the second regional mass transit stop 63 and associated mass transit vehicles and waiting area via any number of interior staircases, elevators, escalators within said buildings and garages for the final decent to the second regional mass transit stop 63 and associated regional mass transit vehicles and waiting area and through commercial or university parking garage pedestrian-oriented improvement area 51 that lie adjacent the parking garages improved by using same kind of sidewalk landscape and hardscape improvements and arcade and awning improvements as experienced on the local traffic artery 14/14A. Such parking could consist of a Mixed-Use, Pedestrian-Oriented Parking Structure (U.S. Pat. No. 7,784,228 B2).

As may be noted in FIG. 3, lobby 34 and regional mass transit platform 37 at upper level 35 of the cross street station and interchange 10 is located over said archway 24, over the local traffic artery 14, and over both community transit boarding and disembarking areas 18/18A. As such, the lobby 34 is of a size such that passengers may comfortably wait while reading or working in a Wi-Fi environment until the time of arrival of their regional mass transit vehicle 39. As such the regional mass transit platform 37 is also large enough to accommodate all passengers likely to seek passage on frequently arriving regional mass transit vehicle 39, especially when such vehicles are express buses for a region express bus service.

Other configurations of the regional mass transit platform can be used to achieve the same by-level functionality (i.e., by using a single platform/or enclosed large elevator positioned on one side or the other of the local traffic artery and have the regional mass transit loading platform lower as if a draw bridge from each or one side of the local traffic artery platform or to have such regional mass transit loading platform rise from the surface of the local traffic artery by providing that the lift mechanism is buried beneath the local traffic artery).

Such passengers will make frequent use of the elevator 36, or escalator 38 to the lobby 34 and, with a purchased regional mass transit ticket, proceeds to the regional mass transit platform 37. Others may wish walk up an interior staircase 48 or the exterior stairway 22 (see FIGS. 2 and 3) to the lobby 34 and the regional mass transit 37. Still others might proceed to the lobby 34 and the regional mass transit platform 37 by walking across the pedestrian-oriented shared-use bridge 42 from the commercial or university campus community area 46 and it's parking garages 44, 44A and 44B on the other side of the primary traffic artery 16.

From the lowered platform 37, using the ramp platform sections 37B/37C, disembarking regional mass transit customers can return to the sidewalk 13/13A adjacent the local traffic artery 14 and then simply walk across primary traffic artery 16 adjacent the traffic artery intersection 12 in the pedestrian crossing area demarked by crossing strips 47/47A after cycling the traffic artery intersection traffic light control signals 55 to a red light for all vehicular traffic in order to access the commercial or university campus community area 46 or to use community transit vehicle 17A crossing the primary traffic artery 16 to access substantially residential community 64 destinations. To access the substantially residential community 64, the disembarking regional mass transit customers can walk safely down the sidewalk 13/13A adjacent the local traffic artery 14 or use community transit vehicle 17. Similarly, passengers after disembarking from regional mass transit vehicle 39, who anticipate a waiting time period before catching a second transit vehicle, may use the community transit waiting areas 20/20A or use the exterior stairway 22, the interior staircase 48, elevator 36 or escalator 38 to ascend to and use the lobby 34, balconies 58/58A or exterior stairway 22 to wait for their next transit trip segment. From the lobby 34 or local traffic artery 14, transit customers can shop, snack, drink refreshments, read, or socialize while waiting.

It is previously noted that the width of archway 24 would span to the anticipated width of the local traffic artery 14 and such archway 24 includes support elements outward from the local traffic artery 14 for the community transit boarding and disembarking areas 18/18A and vertical transport structures and equipment consisting of the interior staircase 48, escalator 38 and elevator 36. To keep the opportunities to access to various mass transit vehicles proximate for intermodal transfers, the cross street station and interchange 10 must be multi-level and remain substantially within the local traffic artery 14 and the right-of-way of the traffic artery intersection 12.

The local traffic artery 14 with two lanes has a width of ten feet per lane or approximately 20 feet total, with up to two turning lanes, another approximately 20 feet might also need to be also spanned by the archway 24 plus an additional 20 feet or more for the support elements to each side of the archway, community transit vehicle boarding and disembarking areas 18/18A, and the vertical transport structures and equipment means a total width of the archway 24 with support structures and street level uses is approximately 80 feet. At a total width of 80 feet or more the archway 24 and related support elements joins the upper level 35 of the cross street station and interchange 10 to present a gateway feature for the substantially residential community 46 and visual obstacle to incoming traffic from the primary traffic artery 16 seeking to turn into the local traffic artery 14.

The cross street station and interchange 10, in its function as a multi-modal transit station, also provides ease of access to a commercial or university campus community area 46 in combination with the use of the pedestrian-oriented shared-use bridge 42 that extends from the upper level 35 at the same height above the traffic artery intersection 12 as the upper level 35 of the cross street station and interchange 10 to the commercial or university campus community area 46. See FIG. 4 and FIG. 5.

As previously discussed, a further bridge 52, crossing said local traffic artery 14A on the other side of the traffic artery intersection 12 from the cross street station and interchange 10 may also be provided to connect commercial or university parking garage 44 and commercial or university parking garage 44A or otherwise connect structures within the commercial or university campus community area 46. Such further bridge 52 would be wide enough to accommodate at least one traffic aisle and often two traffic aisles for vehicles (i.e., approximately 10 to 20 feet) and area stripped for pedestrian movements (i.e., approximately 10 feet) for a total width of 30 feet or more. In the alternative, such further bridge 52 could provide a two level bridge to separate vehicular traffic from pedestrian traffic and to include some mixed-use space within the level allocated for pedestrian movement.

Should the volume of traffic to and from traffic artery intersection 12 or commercial or university campus community area 46 justify, a still further bridge 54 configured as with further bridge 52 may be constructed to a commercial or university parking garage 44B (see FIG. 4 and FIG. 5), especially when this commercial or university parking garage 44B houses within it at the first floor a second regional mass transit stop 63 and associated regional mass transit vehicles and waiting area.

To facilitate movement by regional mass transit customers from the second or some higher level of the commercial or university parking garage 44A to a second regional mass transit stop 63 and associated regional mass transit vehicles and waiting area, a second exterior stairway 65 can be positioned at the commercial or university parking garage 44A so that it descends to an area proximate to the second regional mass transit stop 63. As with the vertical transport structures and equipment in the cross street station and interchange 10, such pedestrian movements from upper levels of the commercial or university parking garage 44A to the second regional mass transit stop 63 and associated regional mass transit vehicles and waiting area can be also accomplished by elevators, escalators, and large staircase within the commercial or university parking garage 44A.

The second regional mass transit stop 63 consists of a whatever boarding and disembarking area is installed wholly within the commercial or university parking garage 44B and a waiting area that extends from inside commercial or university parking garage 44B outwardly to include covered exterior space adjacent the base of the second exterior stairway 65. Adjacent the second regional mass transit stop 63 is a second metropolitan mass transit stop 57 and associated second metropolitan mass transit vehicles and waiting area.

Residential community parking garages 45/45A can be found near plaza 66 within the substantially residential community 64. They are connected together by a residential community parking structure bridge 56 to facilitate movement of pedestrians and vehicles between residential community parking garage 45 and residential community parking garage 45A. This residential community parking structure bridge 56 can be configured as suggested by the description of the further bridge 52 and still further bridge 54. A third exterior stairway 68 can extend from a second or some other upper levels of the residential community parking garage 45 to the plaza 66. The area around the residential community parking garages 45/45A can be used for mixed use and community destinations liner buildings and pedestrian oriented improvements demarked as a residential parking garage pedestrian-oriented improvement area 53.

As with the cross street station and interchange 10, such pedestrian movements from the upper levels of the residential community parking garage 45 to the plaza 66 can also be accomplished by elevators, escalators, and interior staircases within the residential community parking garage 45. Any of the local streets can be used for vehicular access to the residential community parking garage 45/45A, but a preferred roadway network would assume access from some other significant traffic artery instead of the primary traffic artery 16 so that traffic can be dispersed as it approaches parking options within the substantially residential community area 64 as compared to the commercial or university campus community area 46.

Such parking could consist of a Mixed-Use, Pedestrian-Oriented Parking Structure (U.S. Pat. No. 7,784,228 B2) and the Informed Traveler Program and Applications (see our application Ser. No. 13/847,024) could be used to guide vehicular traffic going to one set of parking garages (i.e., residential community parking garages 45/45A) in the substantially residential community 64 or to guide vehicular traffic going to the other set of parking garages (commercial or university campus garages 44/44A/44B) in the commercial or university campus community area 46.

A cross street station and interchange 10, as above described, may serve many purposes, inclusive of the connection of a commercial or university campus community area 46 to the substantially residential community area 64 in which such areas are otherwise separated from each other by a primary traffic artery 16 or the like. A schematic of such an area, with the cross street station and interchange 10 and related pedestrian-oriented and transit access system improvements as above described, is shown in FIG. 4. A closer view of the traffic artery interchange 12 elements is shown in FIG. 5.

Further, the exterior stairway 22 and interior staircase 48 are used by residents, students and other visitors to the area who have been dropped-off by regional mass transit vehicle 39, metropolitan mass transit vehicle 32, or community transit vehicles 17/17A or arrived as pedestrians, bicyclists, or motorists in order to reach upper level 35 of the cross street station and interchange 10.

The exterior stairway 22 has other uses as a seating for outdoors events scheduled in the vicinity of the exterior stairway 22 and to generally view the area from an elevated position. For this reason, events are programs in and around the exterior stairway 22, second exterior stairway 65, and third exterior stairway 68. The opportunity to extend the height elevation of the cross street station and interchange 10 can be first explored in the situation where a covered third floor landing is established above the interior staircase 48 to provide for an improved viewing area 59 for incoming transit and the adjoining communities that can also be used as an additional area to sell and serve refreshments and snacks.

From the lobby 34, travelers may routinely purchase retail items and purchase and enjoy food, and refreshments (see FIG. 3), embark on a regional mass transit trip, view approaching mass transit, or access the pedestrian-oriented shared-use bridge 42 for a return to commercial or university campus community area 46, the commercial or university parking garages 44, 44A or 44C, or other structures in the commercial or university campus community area 46 thereof. The second exterior stairway 65 and third exterior stairway 68 may have similar multiple uses.

The above-described structural articulation of function operates to aggregate pedestrians at the cross street station and interchange 10 from both the substantially residential community 64 and the commercial or university campus community 46 so that they may access transit services of various forms and in enlarged numbers. Whether or not originating from commercial or university campus community area 46, including when using commercial or university parking garages 44, 44A or 44B, or the substantially residential community area 64, including when using the residential community parking garages 45/45A (see FIG. 4), access between communities is improved along with transit access. Such ease of movement to regional mass transit vehicles 39, metropolitan mass transit vehicle 32, community transit vehicles 17/17A and community-based paratransit vehicles 19 from either the commercial or university campus community area 46 or the substantially residential community area 64 provides access to a great multitude of destinations and therefore encourages a more frequent use of the transit options in combination with pedestrian and bicycle movements as the means of transport or as a means of transport linked with a private passenger automotive trip segments and structured parking available at the commercial or university campus garages 44/44A/44B and residential community parking garages 45/45A.

Cross street station and Interchange 10 will facilitate large-scale pedestrian-oriented movement (tens of thousands of people walking and intermittently using bicycles, community transit vehicles 17/17A) between the commercial or university campus community area 46 and the substantially residential community area 64 as well as to various modes of transport. Such large-scale pedestrian-oriented movements not happen otherwise, both by reason of the obstacles presented by primary traffic artery 16 and because of differences in interests and socioeconomic environments that give community residents, students, employees and visitors little reason to walk or otherwise move from one community to another. With the upper level 35 of the cross street station and interchange 10 and community events at plaza 66 and 66A and at other venues within the cross street station and interchange 10 facilities, socio-economic bonds will develop within the community population and from that a single flood resistant and economically resilient community will arise.

Such large-scale pedestrian-oriented movements will occur more frequently when using a cross street station and interchange 10 when the traveler also is using an Informer Traveler program and Applications (see our application Ser. No. 13/847,024). Mutual community Interests and congress will become noticeable in the plazas 66/66A, the local traffic artery 14/14A, the cross street station and interchange 10, and related pedestrian-oriented public spaces once these systemic pedestrian-oriented improvements are deployed and the blockage between communities as presented by the primary traffic artery 16 is removed.

Cross street station and interchange 10 provides access to community events occurring within the substantially residential community area 64 and to educational, and business events or medical facilities within commercial or university campus community area 46. As such, the cross street station and interchange 10 acts as a special social rod and fulcrum and inclined plane to more easily facilitate and leverage the movement and attraction of residents and visiting travelers to and through both communities from destinations within either of the communities or from destinations within the metropolitan area or region accessible via metropolitan mass transit vehicle 32 or regional mass transit vehicle 39.

While there has been shown and described above the preferred embodiment of the instant invention, it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

We claim:

1. A cross street station and interchange for use at a traffic artery intersection of a primary regional automotive traffic artery and a local automotive traffic artery and extending outward therefrom along the traffic artery to improve pedestrian and bicyclist traffic safety, increase the total number of pedestrian, bicycles, and community, metropolitan and regional transit trips, reduce the private passenger automotive vehicle miles traveled, and adapt to climate change with specific reference to sea level rise, the cross street station and interchange comprising:

(a) traffic calming highway improvements at a street level to reduce traffic speeds within the primary traffic artery as vehicles approach, pass through, and turn at the traffic artery intersection into the local traffic artery and reduce conflicts as between vehicular traffic and pedestrians and bicyclists crossing the primary traffic artery at the traffic artery intersection of the primary traffic artery and the local traffic artery;

(b) traffic calming improvements at the street level to substantially reduce traffic speeds of cars, trucks, and community transit vehicles within the local traffic artery;

(c) sidewalks adjacent the local traffic artery at the street level, widened to increase capacity for larger numbers of pedestrians to walk along sidewalks outward from the local traffic artery, one sidewalk is adjacent to an ingress traffic lane and another sidewalk is adjacent an egress traffic lane;

(d) mixed-use and community destination buildings at the street level outward from the local traffic artery and said sidewalks to form a substantially continuous wall of structure, arcades and awnings;

(e) landscape and hardscape within the sidewalk and integrated with the mixed-use and community destination buildings inclusive of decorative outdoor lighting to provide a partial sun shade for pedestrians during the day, illumination of pedestrian pathways during the night, and seating during the day or night;

(f) an archway with associated support elements, adjacent said traffic artery intersection and supporting the lobby and regional mass transit platform at an upper level and having a dimension sufficient to accommodate a community transit vehicle and other automotive traffic upon said local traffic artery passing underneath the archway and within the archway support elements, a community transit boarding and disembarking area and adjacent vertical transport structures including an elevator, escalator and interior staircase;

(g) a lobby at the upper level above and spanning the archway and its support elements, including a mix of retail uses associated with daily needs of the traveling public, regional mass transit ticketing facilities, and a regional mass transit waiting area extending onto a regional mass transit platform;

(h) a regional mass transit platform having a central platform section for newly ticketed passengers boarding regional mass transit and two ramp platform sections extending outwardly from the central platform section for passengers disembarking from regional mass transit at the cross street station and interchange to the sidewalks outward from the local traffic artery in which all three platform sections span across the local traffic artery to the sidewalks on each side of the local traffic artery and in which the regional mass transit platform, initially located at an upper level of the cross street station and interchange adjacent the lobby and used for placement of newly ticketed regional mass transit boarding passengers on the regional mass transit platform, is selectably lowered to the street level at the height elevation of the regional mass transit vehicle floor upon arrival of a regional mass transit vehicle at the most outward lane of the primary traffic artery, designated for the regional mass transit vehicle to stop between two pedestrian crossing areas themselves demarked by crossing indicia that cross primary traffic artery;

(i) a boarding and disembarking area for local community transit services at the street level located at the height elevation of the adjacent sidewalks and furthest away from the primary traffic artery while remaining under the archway and adjacent its support elements, immediately adjacent an ingress traffic lane within the local traffic artery at which the community transit vehicle is demarked to stop;

(j) a further boarding and disembarking area for local community transit services at the street level located at the elevation of the adjacent sidewalks and furthest away from the traffic artery intersection while remaining under the archway and adjacent the support elements, immediately adjacent an egress traffic lane within the local traffic artery where the community transit vehicle is demarked to stop;

(k) a boarding and disembarking area for metropolitan mass transit vehicles at the street level located at the height elevation of the adjacent sidewalks and just before entering the traffic artery intersection such that it is immediately adjacent the area within the outward lane of the primary traffic artery closest to the substantially residential community area demarked for metropolitan mass transit vehicles to stop and before reaching the primary of two pedestrian crossing areas demarked by indicia across the primary traffic artery;

(l) a yet further boarding and disembarking area for metropolitan mass transit vehicles at the street level on the other side of the primary traffic artery and traffic artery interchange from said boarding and disembarking area for metropolitan mass transit located at the height elevation of the adjacent sidewalks and just before entering the traffic artery intersection immediately adjacent the area within the outward lane of the primary traffic artery closest to a commercial or university campus community area demarked for metropolitan mass transit vehicles to stop and before reaching the primary of two pedestrian crossing areas themselves demarked by indicia across the primary traffic artery; and (m) when said regional mass transit platform, and vertical transport structures and equipment are not located on both sides of the primary traffic artery, a pedestrian bridge across the primary traffic artery, having one end of said pedestrian bridge at said upper level and from which pedestrians may either directly enter or leave the lobby and proceed to the street level using said vertical transport structures and equipment or the regional mass transit platform and may also use other stairs, escalators and elevators or ramps to facilitate migration from the opposite end of the pedestrian bridge after crossing the primary traffic artery to the street level.

2. The system and interchange as recited in claim 1, further comprising:

a plaza at the street level located within a substantially residential community at the end of a segment of said local traffic artery beginning at the traffic artery intersection with the primary traffic artery and ending at a significant community destination approximately one-half mile distant from said traffic artery intersection, the plaza having associated sidewalks, mixed-use and community destination buildings, and landscape and hardscape improvements such that plaza sidewalks are wider and plaza mixed-use and community destination buildings are taller than those along a segment of the local traffic artery and the plaza landscape and hardscape improvements are similar to those along that segment of the local traffic artery.

3. The system and interchange as recited in claim 1, further comprising:

vertical transport structures and equipment, including an exterior stairway, interior staircase, and escalator for large-scale pedestrian movements and at least one elevator for the handicapped for transport between the community transit boarding and disembarking area, the metropolitan mass transit waiting area, and the crosswalk areas indicated for crossing of the primary traffic artery, and sidewalks associated therewith at the street level to the lobby, regional mass transit platform, and pedestrian bridge at the upper level.

4. The cross street station and interchange as recited in claim 1, in which:

the traffic lanes of the primary traffic artery narrowed to define a width of 11 feet or less for each traffic lane; and
said narrowed lanes of traffic of the primary traffic artery define a length of 1000 feet or less in either direction from said traffic artery interchange with the local traffic artery.

5. The cross street station and interchange as recited in claim 4, in which said narrowed lanes of traffic of the primary traffic artery are rougher in texture for the length of the narrowed traffic lanes.

6. The cross street station and interchange as recited in claim 5, further comprising:

a median centered within the primary traffic artery on one side of the traffic artery intersection with the local traffic artery and a local median centered within the primary traffic artery on the other side of the traffic artery intersection with the local traffic artery.

7. The cross street station and interchange recited in claim 5, in which the medians define a width of at least 10 feet or more; and a length of at least 30 feet or more.

8. The cross street station and interchange is recited in claim 1, further comprising:

crosswalk areas extending across said primary traffic artery and medians adjacent to and on both sides of the local traffic artery as it crosses the primary traffic artery at the traffic artery intersection, to enable painted crossing strips a contrasting color compared to that of the traffic lanes to demark the crosswalk area for pedestrians and bicyclists to cross the primary traffic artery and a median immediately before and immediately after the local traffic artery as it crosses the primary traffic artery at the traffic artery intersection.

9. The cross street station and interchange as recited in claim 8, in which the crosswalk area across the primary traffic artery and median defines a width of at least 10 feet.

10. The cross street station and interchange as recited in claim 1, further comprising:

a large specimen tree or similar object similarly vertically arrayed and located from the point of view of vehicular traffic in the primary traffic artery just before each crosswalk area within the median and a large specimen tree or similar object similarity vertically arrayed located just after the crosswalk area within each median from the point of view of vehicular traffic in the primary traffic artery.

11. The cross street station and interchange as recited in claim 5, further comprising an area of the traffic artery intersection requiring vehicles to negotiate a turning radius of about 90 degrees between said primary traffic artery and said local traffic artery and between said local traffic artery and said primary traffic artery.

12. The cross street station and interchange as recited in claim 11, further comprising traffic light control signals cycled to a red light by the pedestrian and bicyclists seeking to cross the primary traffic artery at the traffic artery intersection in areas demarked by the crossing indicia.

13. The cross street station and interchange as recited in claim 11, further comprising night time lighting to clearly illuminate the traffic artery intersection.

14. The cross street station and interchange as recited in claim 13, comprising traffic artery intersection lighting incorporated into the pedestrian bridge.

15. The cross street station and interchange as recited in claim 13, in which narrowed ingress and egress traffic lanes of the local traffic artery, with adjacent sidewalks and mixed-use and community destinations buildings, define a length of at least one mile and such length of the local traffic artery is transected by the primary traffic artery.

16. The cross street station and interchange as recited in claim 15, in which:

the archway, lobby, vertical transport structures and equipment, regional mass transit platform, and adjacent community transit boarding and discharge areas and metropolitan mass transit waiting areas are located between the termini of said narrowed traffic lanes of the local traffic artery and adjacent said traffic artery intersection.

17. The cross street station and interchange as recited in claim 15, in which:
said ingress traffic lane, egress traffic lane, and community transit vehicles provide pedestrian-oriented transportation and socio-economic services to a substantially residential community on one side of the primary traffic artery and a commercial or university campus community on the other side of the primary traffic artery.

18. The cross street station and inter change as recited in claim 15, in which said initial segments of a widened sidewalk define an elevational height of at least 5 inches above an outward edge of the local traffic artery.

19. The cross street station and interchange as recited in claim 18, in which local sidewalk segments of said widened sidewalks are further outward from the local traffic artery than an initial sidewalk segment of the widened sidewalk and adjacent to said initial sidewalk segment of the widened sidewalk and defines a width of another ten feet or more in addition to the initial sidewalk segment of the widened sidewalk.

20. The cross street station and interchange recited in claim 15, in which local sidewalk segments define an elevation height of at least 10 inches above the level of the outward edge of the local traffic artery.

21. The cross street station and interchange as recited in claim 15, in which said sidewalks define a width of at least 40 feet if said sidewalk is also any of (a) adjacent the boarding and disembarking area for local community transit services, (b) the boarding and discharging area for metropolitan mass transit, (c) the regional mass transit platform for regional mass transit vehicles when lowered to the street level, or (d) immediately adjacent the traffic artery intersection.

22. The cross street station and interchange as recited in claim 1, said arcades incorporated within a substantially continuous wall of mixed-use and community destination buildings defining an elevational height of at least 15 inches above the level of the outward edge of the local traffic artery.

23. The cross street station and interchange as recited in claim 1, in which a substantially continuous wall of structure, arcades, and awnings include integrated mixed-use and community destination buildings doorways, courtyards, entryways, optically transparent or open windows and other façade and entry features along the primary floor of such buildings and balconies, doorways, exterior stairways, operative windows, and similar façade and entry features facing the local traffic artery and sidewalks in the several floors above the primary floor of such buildings.

24. The cross street station and interchange as recited in claim 2, in which said local traffic artery, plaza, sidewalks, and a substantially continuous wall of mixed-use and community destination buildings having landscaping, outdoor lighting, and hardscaping, establish a pedestrian-oriented urban environment on both sides of the local traffic artery and within the plaza that is safe, comfortable, and useful while providing pedestrians with protection from the rain, wind, sun, heat, and cold when walking on either side of, and adjacent to, the local traffic artery.

25. The cross street station and interchange as recited in claim 2, in which said local traffic artery, plaza, sidewalks, and a substantially continuous wall of mixed-use and community destination buildings establish a pedestrian-oriented urban environment on both sides of the local traffic artery and within the plaza providing pedestrians with protection from the rain, wind, sun, heat, and cold when walking on either side of, and adjacent to, the local traffic artery.

26. The cross street station and interchange as recited in claim 4, further comprising:
steps and inclined ramp areas along the length of the narrowed traffic lanes within the local traffic artery between an ingress traffic lane and the adjacent sidewalk and between the egress traffic lane and the other adjacent sidewalk to continuously or intermittently allow pedestrians to step or roll a wheelchair, hand cart or personal transport wagon from the height elevation of the outer edges of the local traffic artery to the elevation of the respective sidewalks and areas within an arcade and under awnings.

27. The cross street station and interchange as recited in claim 26, further comprising:
additional steps and incline areas at the traffic artery intersection between the outer edge of said primary traffic artery and said sidewalk to continuously or intermittently allow pedestrians to step or roll a wheelchair, hand cart, personal transport wagon, or similar devises from the elevation of the outer edges of the primary traffic artery to height elevation of the respective sidewalks and areas within arcades and under awnings.

28. The cross street station and interchange as recited in claim 1, further comprising:
a seating area for up to 20 passengers waiting arrival of local community transit adjacent services the community transit boarding and disembarking area and underneath an exterior stairway.

29. The cross street station and interchange as recited in claim 28, further comprising:
said seating area for up to 20 passengers waiting arrival of local community transit services adjacent the community transit boarding; and
a disembarking area underneath an arcade and awning, said exterior stairway not adjacent the community transit boarding and disembarking area.

30. The cross street station and interchange as recited in claim 1, further comprising:
a midblock table top crossing at middle of the city blocks transected by the local traffic artery to calm or slow the traffic within the local traffic artery, ramping up from the elevation of the local traffic artery to the height elevation equal or nearly equal to the adjacent sidewalks, and providing a level crossing area demarked by crossing indicia for pedestrians and those in wheelchairs, pulling handcarts and personal transport wagons, cross from one sidewalk to the other sidewalk across the local traffic artery, before ramping downward to the street elevation.

31. The cross street station and interchange as recited in claim 30, in which said midblock table top crossing defines a width across its top of at least ten feet from one sidewalk to the other over the ingress and egress traffic lanes of the local traffic artery.

32. The cross street station and interchange as recited in claim 1, further comprising:
four-way traffic crossing strips painted across the traffic lanes of the local traffic artery and local street that intersects with the local traffic artery, the four-way traffic crossing strips as wide as the adjoining sidewalks and demark in a contrasting color compared to the traffic lanes the four-way traffic crossing area where pedestrians and those in wheelchairs or pulling handcarts and personal transport wagons cross the local traffic artery or the local street at the intersection of said local traffic artery and said local street.

33. The cross street station and interchange as recited in claim 32, comprising:
    an elevated intersection is installed where said local traffic artery and local street intersect wherein the local traffic artery and local street traffic lanes ramp up from the height elevation of said local traffic artery and said local street to a height elevation equal to the adjacent sidewalks and remain at that height throughout the intersection and the said four-way traffic crossing area before ramping downward to the elevation of the local traffic artery and local cross streets.

34. The cross street station and interchange as recited in claim 1, further comprising:
    oversized pedestrian controlled traffic control lighting upon entering or exiting the substantially residential community at the local traffic artery.

35. The cross street station and interchange as recited in claim 1, in which said lobby floor elevation, regional mass transit platform floor elevation, and bridge floor elevation each define a height of up to 20 feet above said street level.

36. The cross street station and interchange as recited in claim 1, in which said regional mass transit platform defines a width of at least 15 feet or more and defines a length of at least 50 feet.

37. The cross street station and interchange as recited in claim 26, in which said regional mass transit platform includes:
    a mechanism effecting horizontal and lateral adjustments to position the regional mass transit platform at the floor level of the regional mass transit vehicle before passengers disembark and board regional mass transit vehicle at the cross street station and interchange.

38. The cross street station and interchange as recited in claim 37, in which said central platform section defines a width of 15 feet or more and length of 30 feet or more.

39. The cross street station and interchange as recited in claim 37, comprising:
    ramp platform sections rotationally connecting to a central platform section to rotate upwards enabling ramp platform sections to extend outwardly at the opposite ends of the central platform section to the sidewalk height elevation on both sides of the regional mass transit platform permitting disembarking regional mass transit passenger to complete an exit process from the regional mass transit vehicle.

40. The cross street station and interchange as recited in claim 26, further comprising:
    egress traffic light control signals located on archway support elements facing traffic exiting the substantially residential community; and
    ingress traffic light control signals located on the archway support elements facing the traffic artery intersection, the signals cycling to a red or stop light before a crossing gate is lowered across the egress and ingress lanes of traffic of the local traffic artery.

41. The cross street station and interchange as recited in claim 1, further comprising:
    traffic artery intersection traffic light control signals located within the traffic artery intersection of the primary traffic artery and the local traffic artery, the signals cycling to a red or stop light after the egress and ingress traffic light control signals cycle to a red or stop light and before a crossing gate is lowered across the egress and ingress lanes of traffic of the local traffic artery.

42. The cross street station and interchange as recited in claim 1, further comprising:
    a crossing gate selectably lowered across the egress and ingress lanes of traffic of the local traffic artery under the archway to stop vehicles within the egress traffic lane from continuing within the egress lane to a location where said mass transit is be lowered, said crossing gate otherwise raised upwards as not to impede vehicular traffic on the local traffic artery.

43. The cross street station and interchange as recited in claim 1, further comprising:
    an exterior caging mechanism that is positioned across both the ingress and egress traffic lanes of the local traffic artery and outward from sides of the central platform section facing the local traffic artery and traffic artery intersection such that the external caging mechanism is lowered from the archway support elements before the regional mass transit platform is lowered and after the crossing gate is lowered such that the external cage mechanism is otherwise positioned upwards just below the elevation height of the archway as not to block the egress and ingress lane of the local traffic artery.

44. The cross street station and interchange as recited in claim 2, comprising:
    a local plaza at the street level is located within the commercial and university campus community at one end of said local traffic artery from the plaza located within the substantially residential community, said local plaza including wider sidewalks and a taller wall of mixed-use and community destination buildings than those along the local traffic artery and similar landscape and hardscape improvements as those located along the local traffic artery; and
    said local plaza to establish a pedestrian-oriented urban environment that is safe, comfortable, and useful while providing pedestrians with protection from the rain, wind, sun, heat, and cold when walking or attending community events within the plaza.

45. The cross street station and interchange as recited in claim 44 in which:
    one or more of said plazas define a carfree center only permitting freight, delivery trucks, other automotive vehicles for load and unloading goods, furniture, food, and equipment and emergency vehicles after or before hours of when pedestrian activities generally occur.

46. The cross street station and interchange as recited in claim 1, comprising:
    separate areas provided for regional mass transit vehicles, metropolitan mass transit vehicles and community transit vehicles to stop proximate and immediately adjacent to each other.

47. The cross street station and interchange as recited in claim 1, in which said cross street station and interchange includes:
    space for community-based paratransit vehicles to discharge or board passengers at the community transit boarding and disembarking areas.

48. The cross street station and interchange as recited in claim 47, in which the community-based paratransit vehicle may be used for local community transit services when not needed by paratransit customers.

49. The cross street station and interchange as recited in claim 1, further comprising:
    a side of said pedestrian bridge emerging at an elevated level from a commercial or university campus community separated from a substantially residential community from the primary traffic artery or the adjacent community located on the other side of the primary traffic artery.

50. The cross street station and interchange as recited in claim 3, further comprising:
a local grouping of an archway, a lobby, vertical transport structures and equipment, regional mass transit platform, boarding and discharge areas for community transit vehicles and metropolitan mass transit vehicles located in the commercial or university campus community, having at least one pedestrian bridge accessible from said upper level on one side of the primary traffic artery to the upper level of the other side of the primary traffic artery.

51. The cross street station and interchange as recited in claim 3, comprising:
an elevation of either or both the primary traffic artery and local traffic artery by any roadway resurfacing or other roadway improvement means to avoid frequent inundation without disrupting or altering the sidewalk, the floors under arcades and awnings, and primary floor of the mixed-use and community destination buildings elevations, regional mass transit platform for regional mass transit, boarding and disembarking areas for community transit vehicles and metropolitan mass transit vehicles, vertical transport structures and equipment, and pedestrian bridge.

52. The cross street station and interchange as recited in claim 2, further comprising:
a structured parking garage either adjacent the plaza, along the primary traffic artery, or adjacent the upper level of the cross street station and interchange such that motorists can easily migrate from being vehicular occupants to pedestrians, bicyclists, or users of mass transit.

53. The cross street station and interchange as recited in claim 1, comprising:
structured parking garage is surrounded by mixed-use or community destination buildings with arcades, awnings, sidewalks, and associated landscape and hardscape improvements.

54. The cross street station and interchange as recited in claim 1, further comprising:
windows, doorways, and balconies around the perimeter of the lobby to establish, with exterior stairways, a view of the surrounding community, community facilities, traffic arteries, and approaching regional mass transit vehicles, metropolitan mass transit vehicles, community transit vehicles, and community-based paratransit vehicles.

55. The cross street station and interchange as recited in claim 44, further comprising:
structured parking garages proximate to and adjacent at least one of said plazas, primary traffic artery, lobby, regional mass transit platform, or the boarding and disembarking areas for metropolitan mass transit and local community transit services.

* * * * *